US010039029B2

(12) United States Patent
Luna et al.

(10) Patent No.: US 10,039,029 B2
(45) Date of Patent: *Jul. 31, 2018

(54) PREDICTIVE FETCHING OF MOBILE APPLICATION TRAFFIC

(71) Applicant: Seven Networks, LLC, Marshall, TX (US)

(72) Inventors: Michael Luna, Redwood City, CA (US); Ari Backholm, Los Altos, CA (US); Steve Petersen, Los Gatos, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/829,310

(22) Filed: Dec. 1, 2017

(65) Prior Publication Data

US 2018/0084453 A1  Mar. 22, 2018

Related U.S. Application Data

(60) Continuation of application No. 15/210,523, filed on Jul. 14, 2016, now Pat. No. 9,838,905, which is a
(Continued)

(51) Int. Cl.
  *H04W 72/00* (2009.01)
  *H04L 29/08* (2006.01)
  *H04W 28/02* (2009.01)

(52) U.S. Cl.
  CPC ......... *H04W 28/0289* (2013.01); *H04L 67/10* (2013.01); *H04L 67/2842* (2013.01); *H04L 67/2857* (2013.01)

(58) Field of Classification Search
  CPC .......... H04W 28/0289; H04L 67/2842; H04L 67/10; H04L 67/2857
  See application file for complete search history.

(56) References Cited

U.S. PATENT DOCUMENTS 6,157,941 A  12/2000  Verkler et al.
6,631,469 B1  10/2003  Silvester
(Continued)

FOREIGN PATENT DOCUMENTS

| JP | 2009005118 A | 1/2009 |
| WO | WO2006103681 A2 | 10/2006 |
| WO | WO2008061042 A2 | 5/2008 |

OTHER PUBLICATIONS

Latedroid, "JuiceDefender," Jan. 19, 2010, and comments posted on Feb. 14, 16, and 17, 2010, available at https://web.archive.org/web/20100221214647/http://www.latedroid.com/2010/01/juicedefender.html.
(Continued)

*Primary Examiner* — Ajit Patel
(74) *Attorney, Agent, or Firm* — NK Patent Law, PLLC

(57) ABSTRACT

A mobile device having an established multiplexed connection for optimizing communications is configured for communicating over the established multiplexed connection, predicting an activity session based on application access history, and fetching data for an application before the activity session based on the predicted activity session. A second connection is established that is other than the established multiplexed connection with the mobile device. The fetched data is transmitted over the second connection.

24 Claims, 10 Drawing Sheets

Related U.S. Application Data continuation of application No. 14/467,838, filed on Aug. 25, 2014, now Pat. No. 9,516,129, which is a division of application No. 13/188,553, filed on Jul. 22, 2011, now Pat. No. 8,886,176.

(60) Provisional application No. 61/367,870, filed on Jul. 26, 2010, provisional application No. 61/408,858, filed on Nov. 1, 2010, provisional application No. 61/408,839, filed on Nov. 1, 2010, provisional application No. 61/408,829, filed on Nov. 1, 2010, provisional application No. 61/408,846, filed on Nov. 1, 2010, provisional application No. 61/408,854, filed on Nov. 1, 2010, provisional application No. 61/408,826, filed on Nov. 1, 2010, provisional application No. 61/408,820, filed on Nov. 1, 2010, provisional application No. 61/416,020, filed on Nov. 22, 2010, provisional application No. 61/416,033, filed on Nov. 22, 2010, provisional application No. 61/430,828, filed on Jan. 7, 2011, provisional application No. 61/367,871, filed on Jul. 26, 2010.

(56) References Cited

U.S. PATENT DOCUMENTS

| | | | |
|---|---|---|---|
| 6,799,209 | B1 | 9/2004 | Hayton |
| 7,062,567 | B2 | 6/2006 | Benitez |
| 7,194,248 | B2 | 3/2007 | Kim |
| 8,036,718 | B2 | 10/2011 | Lencevicius et al. |
| 8,135,392 | B2 | 3/2012 | Marcellino et al. |
| 8,185,165 | B2 | 5/2012 | Beninghaus |
| 8,284,706 | B2 | 10/2012 | Ulipinar |
| 8,289,891 | B2 | 10/2012 | Ji |
| 8,527,337 | B1* | 9/2013 | Lim ............ G06Q 30/00 434/354 |
| 8,688,826 | B2 | 4/2014 | Black |
| 8,862,416 | B2 | 10/2014 | Black |
| 8,904,206 | B2 | 12/2014 | Black |
| 9,014,672 | B2 | 4/2015 | Lee et al. |
| 9,503,544 | B2 | 11/2016 | Luna |
| 2004/0187039 | A1 | 9/2004 | Yang |
| 2007/0038763 | A1 | 2/2007 | Oestvall |
| 2007/0073766 | A1 | 3/2007 | Porter |
| 2007/0260718 | A1 | 11/2007 | Shenfield |
| 2008/0072086 | A1 | 3/2008 | Kim |
| 2008/0242370 | A1 | 10/2008 | Lando et al. |
| 2009/0055467 | A1 | 2/2009 | Petersen |
| 2009/0061925 | A1 | 3/2009 | Finkelstein et al. |
| 2009/0307511 | A1 | 12/2009 | Fiennes et al. |
| 2010/0077035 | A1 | 3/2010 | Li et al. |
| 2010/0192212 | A1* | 7/2010 | Raleigh ............ G06Q 10/06375 726/7 |
| 2010/0232594 | A1* | 9/2010 | Lawson ............ G06F 9/505 379/220.01 |
| 2010/0250986 | A1 | 9/2010 | Black et al. |
| 2010/0274507 | A1 | 10/2010 | Black et al. |
| 2010/0299455 | A1 | 11/2010 | Master et al. |
| 2011/0131321 | A1 | 6/2011 | Black et al. |
| 2011/0177847 | A1 | 7/2011 | Huang |
| 2011/0185202 | A1 | 7/2011 | Black et al. |
| 2015/0143456 | A1 | 5/2015 | Raleigh et al. |
| 2015/0256476 | A1 | 9/2015 | Kurtzman et al. |

OTHER PUBLICATIONS

Latedroid, "JuiceDefender," https://web.archive.org/web/20100405223340/http://www.latedroid.com/2010/01/juicedefender.html (archived Apr. 5, 2010) ("Latedroid").

Latedroid, "JuiceDefender FAQ," Feb. 9, 2010, available at https://web.archive.org/web/20100223104054/http://www.latedroid.com/2010/02/juicedefender-faq.html (archived Feb. 23, 2010) ("Latedroid FAQ").

Kevin Purdy, "JuiceDefender Saves Batteries by Automating Android Data," Mar. 1, 2010, available at htts://web.archive.org/web/20100304152811/http://lifehacker.com:80/5482663/juicedefender-saves-batteries-by-automating-android-data ("Prudy").

David Ruddock, "8 Great Apps Every Rooted Android User Should Know About," Jul. 13, 2010, available at https://web.archive.org/web/20100718234639/http://www.androidpolice.com/2010/07113/8-great-apps-every-rooted-android-user-should-know-about/ (archived Jul. 18, 2010) ("Ruddock").

"Configuración de Juice Defender y Ultimate Juiced," Jul. 1, 2010, available at https://web.archive.org/web/20100706051635/http://android.scenebeta.com/tutorial/configuracion-de-juice-defender-y-ultimate-juiced (archived Jul. 6, 2010) ("Configuration").

"Android 2.0 Platform Highlights," available at https://web.archive.org/web/20091029032030/http://developer.android.com/intl/zh-CN/sdk/android-2.0-highlights.html (archived Oct. 29, 2009) ("Android 2.0").

Android 2.2 Platform Highlights, available at https://web.archive.org/web/20100522075056/http://developer.android.com/sdk/android-2.2-highlights.html (archived May 22, 2010) ("Android 2.2").

"Android Cloud to Device Messaging Framework," available at https://web.archive.org/web/20100523074155/https://code.google.com/android/c2dm/index.html (archived May 23, 2010) ("C2DM").

Wei Huang, "Android Cloud to Device Messaging," available at https://web.archive.org/web/20100530062514/http://android-developers.blogspot.com/2010/05/android-cloud-to-device-messaging.html (archived May 30, 2010) ("Huang").

Kevin Purdy, "An Exhaustive Guide to Saving Your Smartphone's Battery," Oct. 6, 2009, available at https://web.archive.org/web/20091021200800/https://lifehacker.com/5375325/an-exhaustive-guide-to-saving-your-smartphones-battery (archived Oct. 21, 2009) ("Exhaustive Guide").

"Droid Battery Life Tips and Tricks," Dec. 16, 2009, available at https://web.archive.org/web/20100218152255/http://www.thedroidgeek.com/2009/12/droid-batter-life-tips-and¬tricks.html (archived Feb. 18, 2010) ("Droid").

Jason Perlow, "Stupid DROID Tricks, vol. 1," available at https://web.archive.org/web/20100515153155/http://www.zdnet.com/blog/perlow/stupid-droid-tricks-volume-1/11625?p=11625 (archived May 15, 2010) ("Perlow").

"Save Power with the Droid's Power Control Widget," Jan. 19, 2010, available at https://www.youtube.com/watch?v=fosSGStYRGw ("Power Control Widget Video").

Dianne Hackbom, "Multitasking the Android Way," Apr. 28, 2010, available at https://web.archive.org/web/20100502143906/http://android-developers.blogspot.com/2010/04/multitasking-android¬way.html (archived May 2, 2010) ("Hackborn").

Matt Buchanan, "Giz Explains: How Multitasking Works on a Phone," Apr. 29, 2010, available at https://web.archive.org/web/20100501123852/https://gizmodo.com/5527407/giz-explains-how-multitasking-works-on¬a-phone (archived May 1, 2010) ("Buchanan").

David Quintana, "Mobile Multitasking," Apr. 14, 2010, available at https://web.archive.org/web/20100417073433/http://davidquintana.com/entry/mobile-multitasking/ (archived Apr. 17, 2010) ("Quintana").

"Application Fundamentals," available at https://web.archive.org/web/20090213153037/http://developer.android.com:80/guide/topics/fundamentals.html (archived Feb. 13, 2009) ("Application").

App Log, "Green Power Android App Review," Oct. 25, 2012, available at https://web.archive.org/web/20121102013813/http://www.androidapplog.com/2012/10/android-app-reviews/green-power-saver-for-android/ (archived Nov. 2, 2012) ("App Log").

Latedroid, "JuiceDefender," Jan. 19, 2010, and comments posted on Feb. 14, 16, and 17, 2010, available at https://web.archive.org/web/20100221214647/ http://www.latedroid.com/2010/01/juicedefender.html (archived Feb. 21, 2010) and https://web.archive.org/web/20100405223340/ http://www.latedroid.com/2010/01/juicedefender.html (archived Apr. 5, 2010).

Latedroid, "JuiceDefender FAQ," Feb. 9, 2010, available at https://web.archive.org/web/20100223104054/ http://www.latedroid.com/2010/02/juicedefender-faq.html (archived Feb. 23, 2010).

(56) References Cited

OTHER PUBLICATIONS

Kevin Purdy, "JuiceDefender Saves Batteries by Automating Android Data," Mar. 1, 2010, available at https://web.archive.org/web/20100304152811/ http://lifehacker.com:80/5482663/juicedefender-saves-batteries-byautomating-android-data.
David Ruddock, "8 Great Apps Every Rooted Android User Should Know About," Jul. 13, 2010, available at https://web.archive.org/web/20100718234639/ http://www.androidpolice.com/2010/07/13/8-great-apps-every-rootedandroid-user-should-know-about/ (archived Jul. 18, 2010).
"Configuración de Juice Defender y Ultimate Juiced," Jul. 1, 2010, available at https://web.archive.org/web/20100706051635/ http://android.scenebeta.com/tutorial/configuracion-de-juice-defender-yultimate-juiced (archived Jul. 6, 2010).
"Nexus One User's Guide," Mar. 15, 2010.
"Android 2.0 Platform Highlights," available at https://web.archive.org/web/20091029032030/ http://developer.android.com/intl/zh-CN/sdk/android-2.0-highlights.html (archived Oct. 29, 2009).
Android 2.2 Platform Highlights, available at https://web.archive.org/web/20100522075056/ http://developer.android.com/sdk/android-2.2-highlights.html (archived May 22, 2010).
"Android Cloud to Device Messaging Framework," available at https://web.archive.org/web/20100523074155/ https://code.google.com/android/c2dm/index.html (archived May 23, 2010).
Wei Huang, "Android Cloud to Device Messaging," available at https://web.archive.org/web/20100530062514/ http://android-developers.blogspot.com/2010/05/android-cloud-todevice-messaging.html (archived May 30, 2010).
Kevin Purdy, "An Exhaustive Guide to Saving Your Smartphone's Battery," Oct. 6, 2009, available at https://web.archive.org/web/20091021200800/ https://lifehacker.com/5375325/an-exhaustive-guide-to-saving-yoursmartphones-battery (archived Oct. 21, 2009).
"Droid Battery Life Tips and Tricks," Dec. 16, 2009, available at https://web.archive.org/web/20100218152255/ http://www.thedroidgeek.com/2009/12/droid-batter-life-tips-andtricks.html (archived Feb. 18, 2010).
Jason Perlow, "Stupid DROID Tricks, vol. 1," available at https://web.archive.org/web/20100515153155/ http://www.zdnet.com/blog/perlow/stupid-droid-tricks-volume-1/11625?p=11625 (archived May 15, 2010).
"Save Power with the Droid's Power Control Widget," Jan. 19, 2010, available at https://www.youtube.com/watch?v=fosSGStYRGw.
Dianne Hackbom, "Multitasking the Android Way," Apr. 28, 2010, available at https://web.archive.org/web/20100502143906/ http://android-developers.blogspot.com/2010/04/multitasking-androidway.html (archived May 2, 2010).
Matt Buchanan,"Giz Explains: How Multitasking Works on a Phone," Apr. 29, 2010, available at https://web.archive.org/web/20100501123852/https://gizmodo.com/5527407/giz-explains-how-multitasking-works-ona-phone (archived May 1, 2010).
David Quintana, "Mobile Multitasking," Apr. 14, 2010, available at https://web.archive.org/web/20100417073433/ http://davidquintana.com/entry/mobile-multitasking/ (archived Apr. 17, 2010) ("Quintana").
"Application Fundamentals," available at https://web.archive.org/web/20090213153037/ http://developer.android.com:80/guide/topics/fundamentals.html (archived Feb. 13, 2009.
App Log, "Green Power Android App Review," Oct. 25, 2012, available at https://web.archive.org/web/20121102013813/ http://www.androidapplog.com/2012/10/android-app-reviews/greenpower-saver-for-android/ (archived Nov. 2, 2012).
"Welcome to GreenPower," available at https://web.archive.org/web/20130527140618/ http://batterysaverapp.com:80/ (archived May 27, 2013).
"User Guide," available at https://web.archive.org/web/20130824033813/ http://batterysaverapp.com:80/index.php/user-guide (archived Aug. 24, 2013).
"GreenPower battery saver for Android," Apr. 2, 2013, available at https://www.youtube.com/watch?v=pHQlrHnefx0, No longer available.
"How it works: GreenPower free battery saver," Aug. 15, 2013, available at https://www.youtube.com/watch?v=o1YRtC2_WLc.
Exhibit 019-A1 Invalidity contentions of U.S. Pat. No. 9,247,019 In View of U.S. Pat. No. 6,799,209.
Exhibit 019-A2 Invalidity contentions of U.S. Pat. No. 9,247,019 In View of U.S. Pat. No. 8,289,891.
Exhibit 019-A3 Invalidity contentions of U.S. Pat. No. 9,247,019 In View of W.O. Application No. 2006/103681 A2.
Exhibit 019-A4 Invalidity contentions of U.S. Pat. No. 9,247,019 In View of U.S. Pat. No. 9,014,672.
Exhibit 019-A5 Invalidity contentions of U.S. Pat. No. 9,247,019 In View of U.S. Pat. No. 6,157,941.
Exhibit 019-A6 Invalidity contentions of U.S. Pat. No. 9,247,019 In View of U.S. Pat. No. 8,185,165.
Exhibit 019-A7 Invalidity contentions of U.S. Pat. No. 9,247,019 In View of U.S. Patent Publication No. 2011/0177847A1.
Exhibit 019-A8 Invalidity contentions of U.S. Pat. No. 9,247,019 In View of U.S. Pat. No. 8,036,718B2.
Exhibit 019-A9 Invalidity contentions of U.S. Pat. No. 9,247,019 In View of U.S. Pat. No. 6,631,469B1.
Exhibit 019-A10 Invalidity contentions of U.S. Pat. No. 9,247,019 In View of U.S. Pub. No. 2011/0185202.
Exhibit 019-A11 Invalidity contentions of U.S. Pat. No. 9,247,019 In View of U.S. Pub. No. 2011/0131321.
Exhibit 019-A12 Invalidity contentions of U.S. Pat. No. 9,247,019 In View of U.S. Pub. No. 2010/0274507.
Exhibit 019-A13 Invalidity contentions of U.S. Pat. No. 9,247,019 In View of U.S. Pub. No. 2010/0299455.
Exhibit 019-A14 Invalidity contentions of U.S. Pat. No. 9,247,019 In View of JuiceDefender.
Exhibit 019-A15 Invalidity contentions of U.S. Pat. No. 9,247,019 In View of JuiceDefender on Android Device.
Exhibit 019-A16 Invalidity contentions of U.S. Pat. No. 9,247,019 In View of GreenPower.
Nov. 15, 2017 Seven v. Google & Samsung Invalidity Cover Pleading EDTX: Civil Action No. 2:17-cv-00442-JRG; Civil Action No. 2:17-cv-00441s-JRG.
Xhibit 019-B to Invalidity Contentions Civil Action No. 2:17-cv-00442-JRG; Civil Action No. 2:17-cv-00441s-JRG.
Xhibit C to Civil Action No. 2:17-cv-00442-JRG; Civil Action No. 2:17-cv-00441s-JRG.
Qintana, David, Mobile Multitasking, www.davidquintana.com/entry/mobile-multitasking, Apr. 14, 2010, pp. 1-5.
IOS Application Programming Executing Code in the Background.
"How to Stretch Battery Life on the HTC EVO 4G" by Kendrick published on Jun. 10, 2010.
Google, Nexus One User's Guide, Mar. 15, 2010, pp. 1-334.
Roodyn, Dr. Neil, Mobile PC Power Management, Jun. 2005, https://msdn.microsoft.com/en-us/library/ms812491(d+printer).aspx, pp. 1-13.
Latedroid, JuiceDefender FAQ, Feb. 9, 2010, available at https://web.archive.org/web/20100223104054/ http://www.latedroid.com/2010/02/juicedefender-faq.html (archived Feb. 23, 2010), pp. 1-3.
Latedroid, JuiceDefender, Jan. 19, 2010, and comments posted on Feb. 14, 16, and 17, 2010, available at https://web.archive.org/web/20100221214647/http://www.latedroid.com/2010/01/juicedefender.html (archived Feb. 21, 2010) and https://web.archive.org/web/20100405223340/http://www.latedroid.com/2010/01/juicedefender.html (archived Apr. 5, 2010), pp. 1-5.
Purdy, Kevin, JuiceDefender Saves Batteries by Automating Android Data, Mar. 1, 2010,https://lifehacker.com/5482663/juicedefender-saves-batteries-by-automating-android-data.
Ruddock, Davie, 8 Great Apps Every Rooted Android User Should Know About, Jul. 13, 2010, https://web.archive.org/web/20171002041831/http://www.androidpolice.com/2010/07/13/8-great-apps-every-rooted-android-user-should-know-about/ (archived Jul. 13, 2010).
android.scenebeta.com, Configuration of Juice Defender and Ultimate Juiced, Jul. 1, 2010, https://web.archive.org/web/

(56) References Cited

OTHER PUBLICATIONS

20100706051635/http://android.scenebeta.com/tutorial/configuracion-de-juice-defender-y-ultimate-juiced (archived Jul. 6, 2010).

App Log, "Green Power Android App Review," Oct. 25, 2012, available at https://web.archive.org/web/20121102013813/ http://www.androidapplog.com/2012/10/android-app-reviews/green-power-saver-forandroid/ (archived Nov. 2, 2012).

Welcome to GreenPower, https://web.archive.org/web/20130527140618/ http://batterysaverapp.com:80/ (archived May 27, 2013), pp. 2.

support@batterysaverapp.com, User Guide, https://web.archive.org/web/20130824033813/ http://batterysaverapp.com:80/index.php/user-guide (archived Aug. 24, 2013), pp. 1-2.

Al Admin, How it works: GreenPower free battery saver, Aug. 15, 2013, https://www.youtube.com/watch?v=o1YRtC2_WLc, pp. 1-3.

Android Developers, Android 2.0 Platform Highlights, https://web.archive.org/web/20091029032030/http://developer.android.com/intl/zh-CN/sdk/android-2.0-highlights.html (archived Oct. 29, 2009), pp. 1-3.

Android Developers, https://web.archive.org/web/20100522075056/http://developer.android.com/sdk/android-2.2-highlights.html (archived May 22, 2010), pp. 1-4.

Google Projects for Android: C2DM (Labs), Android Cloud to Device Messaging Framework, https://web.archive.org/web/20100522075056/http://developer.android.com/sdk/android-2.2-highlights.html (archived May 22, 2010), pp. 1-9.

Wei Huang, Android Cloud to Device Messaging, https://web.archive.org/web/20100530062514/http://android-developers.blogspot.com/2010/05/android-cloud-to-device-messaging.html (archived May 30, 2010), pp. 1-3.

Lifehacker, An Exhaustive Guide to Saving Your Smartphone's Battery, https://web.archive.org/web/20091021200800/https://lifehacker.com/5375325/an-exhaustive-guide-to-saving-your-smartphones-battery (archived Oct. 21, 2009), pp. 1-6.

Zdnet, Stupid DROID Tricks, vol. 1, https://web.archive.org/web/20100515153155/http://www.zdnet.com/blog/perlow/stupid-droid-tricks-volume-1/11625?p=11625 (archived May 15, 2010), pp. 1-14.

The Droid Geek [Dot] Com, Droid Battery Life Tips and Tricks, https://web.archive.org/web/20100218152255/http://www.thedroidgeek.com/2009/12/droid-batter-life-tips-and-tricks.html (archived Feb. 18, 2010), pp. 1-3.

You Tube, Save Power With the Droid's Power Control Widget, https://www.youtube.com/watch?v=fosSGStYRGw ("Power Control Widget Video"), Jan. 19, 2010.

Hackborn, Dianne, Multitasking the Android Way, Android Developers, https://web.archive.org/web/20100502143906/http://android-developers.blogspot.com/2010/04/multitasking-android-way.html, (archived May 2, 2010), Apr. 28, 2010, pp. 1-5.

Buchanan, Matt, Giz Explains: How Multitasking Works on a Phone, https://web.archive.org/web/20100501123852/https://gizmodo.com/5527407/giz-explains-how-multitasking-works-on-a-phone (archived May 1, 2010), May 1, 2010, pp. 1-4.

Android Developers, Application Fundamentals, https://web.archive.org/web/20090213153037/http://developer.android.com:80/guide/topics/fundamentals.html (archived Feb. 13, 2009), pp. 1-17.

Invalidity contentions of U.S. Pat. No. 9,516,129 in view of Li, U.S. Pub. No. 2010/0077035.

Invalidity contentions of U.S. Pat. No. 9,516,129 in view of Marcellino, U.S. Pat. No. 8,135,392.

Invalidity contentions of U.S. Pat. No. 9,516,129 in view of Oestvall, U.S. Pat. Pub. No. 2007/0038763.

Invalidity contentions of U.S. Pat. No. 9,516,129 in view of Apple iPhone including iOS4.

Invalidity contentions of U.S. Pat. No. 9,516,129 in view of Black, U.S. Pub. No. 2011/0185202.

Invalidity contentions of U.S. Pat. No. 9,516,129 in view of Black, U.S. Pub. No. 2011/0131321.

Invalidity contentions of U.S. Pat. No. 9,516,129 in view of JuiceDefender.

Invalidity contentions of U.S. Pat. No. 9,516,129 in view of JuiceDefender on Android device.

Invalidity contentions of U.S. Pat. No. 9,516,129 in view of GreenPower.

Invalidity contentions of U.S. Pat. No. 9,516,129 in view of Kim, U.S. Pat. Pub. No. 2008/0072086.

Invalidity contentions of U.S. Pat. No. 9,516,129 in view of devices including Microsoft Windows XP Tablet PC Edition.

Invalidity contentions of U.S. Pat. No. 9,516,129 in view of HTC EVO 4G.

Invalidity contentions of U.S. Pat. No. 9,516,129 in view of Raleigh, U.S. Patent Application Publication No. US 2015/0143456.

Exhibit 129-B to Invalidity Contentions Civil Action No. 2:17-cv-00442-JRG; Civil Action No. 2:17-cv-00441s-JRG.

Exhibit C to Civil Action No. 2:17-cv-00442-JRG; Civil Action No. 2:17-cv-00441s-JRG.

USPTO, Non-Final Office Action in U.S. Appl. No. 15/488,827 dated Feb. 22, 2018.

EPO, Summons to attend oral proceedings for European Patent Application No. 11748780.1, dated Mar. 2, 2018.

EPO, European Search Report in European Patent Application No. 18150556.1 dated May 28, 2018.

USPTO, Final Office Action in U.S. Appl. No. 14/485,700 dated May 10, 2018.

\* cited by examiner

PREDICTIVE FETCHING OF MOBILE APPLICATION TRAFFIC

CROSS-REFERENCE TO RELATED APPLICATIONS

This application is a continuation application of U.S. patent application Ser. No. 15/210,523 entitled "MOBILE APPLICATION TRAFFIC OPTIMIZATION" which was filed on Jul. 14, 2016, being issued as U.S. Pat. No. 9,838,905 on Dec. 5, 2017, which is a continuation application of U.S. patent application Ser. No. 14/467,838 entitled "MOBILE APPLICATION TRAFFIC OPTIMIZATION" which was filed on Aug. 25, 2014, now U.S. Pat. No. 9,516,129 issued on Dec. 6, 2016, which is a divisional application of U.S. patent application Ser. No. 13/188,553 entitled "MOBILE APPLICATION TRAFFIC OPTIMIZATION", which was filed on Jul. 22, 2011, now U.S. Pat. No. 8,886,176 issued on Nov. 11, 2014, which claims the benefit of U.S. Provisional Patent Application No. 61/367,871 entitled "CONSERVING POWER CONSUMPTION IN APPLICATIONS WITH NETWORK INITIATED DATA TRANSFER FUNCTIONALITY", which was filed on Jul. 26, 2010, U.S. Provisional Patent Application No. 61/367,870 entitled "MANAGING AND IMPROVING NETWORK RESOURCE UTILIZATION, PERFORMANCE AND OPTIMIZING TRAFFIC IN WIRE LINE AND WIRELESS NETWORKS WITH MOBILE CLIENTS", which was filed on Jul. 26, 2010, U.S. Provisional Patent Application No. 61/408,858 entitled "CROSS APPLICATION TRAFFIC COORDINATION", which was filed on Nov. 1, 2010, U.S. Provisional Patent Application No. 61/408,839 entitled "ACTIVITY SESSION AS METHOD OF OPTIMIZING NETWORK RESOURCE USE", which was filed on Nov. 1, 2010, U.S. Provisional Patent Application No. 61/408,829 entitled "DISTRIBUTED POLICY MANAGEMENT", which was filed on Nov. 1, 2010, U.S. Provisional Patent Application No. 61/408,846 entitled "INTELLIGENT CACHE MANAGEMENT IN CONGESTED WIRELESS NETWORKS", which was filed on Nov. 1, 2010, U.S. Provisional Patent Application No. 61/408,854 entitled "INTELLIGENT MANAGEMENT OF NON-CACHABLE CONTENT IN WIRELESS NETWORKS", which was filed on Nov. 1, 2010, U.S. Provisional Patent Application No. 61/408,826 entitled "ONE WAY INTELLIGENT HEARTBEAT", which was filed on Nov. 1, 2010, U.S. Provisional Patent Application No. 61/408,820 entitled "TRAFFIC CATEGORIZATION AND POLICY DRIVING RADIO STATE", which was filed on Nov. 1, 2010, U.S. Provisional Patent Application No. 61/416,020 entitled "ALIGNING BURSTS FROM SERVER TO CLIENT", which was filed on Nov. 22, 2010, U.S. Provisional Patent Application No. 61/416,033 entitled "POLLING INTERVAL FUNCTIONS", which was filed on Nov. 22, 2010, U.S. Provisional Patent Application No. 61/430,828 entitled "DOMAIN NAME SYSTEM WITH NETWORK TRAFFIC HARMONIZATION", which was filed on Jan. 7, 2011, the contents of which are all incorporated by reference herein.

BACKGROUND

When WCDMA was specified, there was little attention to requirements posed by applications whose functions are based on actions initiated by the network, in contrast to functions initiated by the user or by the device. Such applications include, for example, push email, instant messaging, visual voicemail and voice and video telephony, and others. Such applications typically require an always-on IP connection and frequent transmit of small bits of data. WCDMA networks are designed and optimized for high-throughput of large amounts of data, not for applications that require frequent, but low-throughput and/or small amounts of data. Each transaction puts the mobile device radio in a high power mode for considerable length of time—typically between 15-30 seconds. As the high power mode can consume as much as $100x$ the power as an idle mode, these network-initiated applications quickly drain battery in WCDMA networks. The issue has been exacerbated by the rapid increase of popularity of applications with network-initiated functionalities, such as push email.

Lack of proper support has prompted a number of vendors to provide documents to guide their operator partners and independent software vendors to configure their networks and applications to perform better in WCDMA networks. This guidance focuses on: configuring networks to go to stay on high-power radio mode as short as possible and making periodic keep alive messages that are used to maintain an always-on TCP/IP connection as infrequent as possible. Such solutions typically assume lack of coordination between the user, the application and the network.

Furthermore, application protocols may provide long-lived connections that allow servers to push updated data to a mobile device without the need of the client to periodically re-establish the connection or to periodically query for changes. However, the mobile device needs to be sure that the connection remains usable by periodically sending some data, often called a keep-alive message, to the server and making sure the server is receiving this data. While the amount of data sent for a single keep-alive is not a lot and the keep-alive interval for an individual application is not too short, the cumulative effect of multiple applications performing this individually will amount to small pieces of data being sent very frequently. Frequently sending bursts of data in a wireless network also result in high battery consumption due to the constant need of powering/re-powering the radio module.

DETAILED DESCRIPTION

Figure 1A:
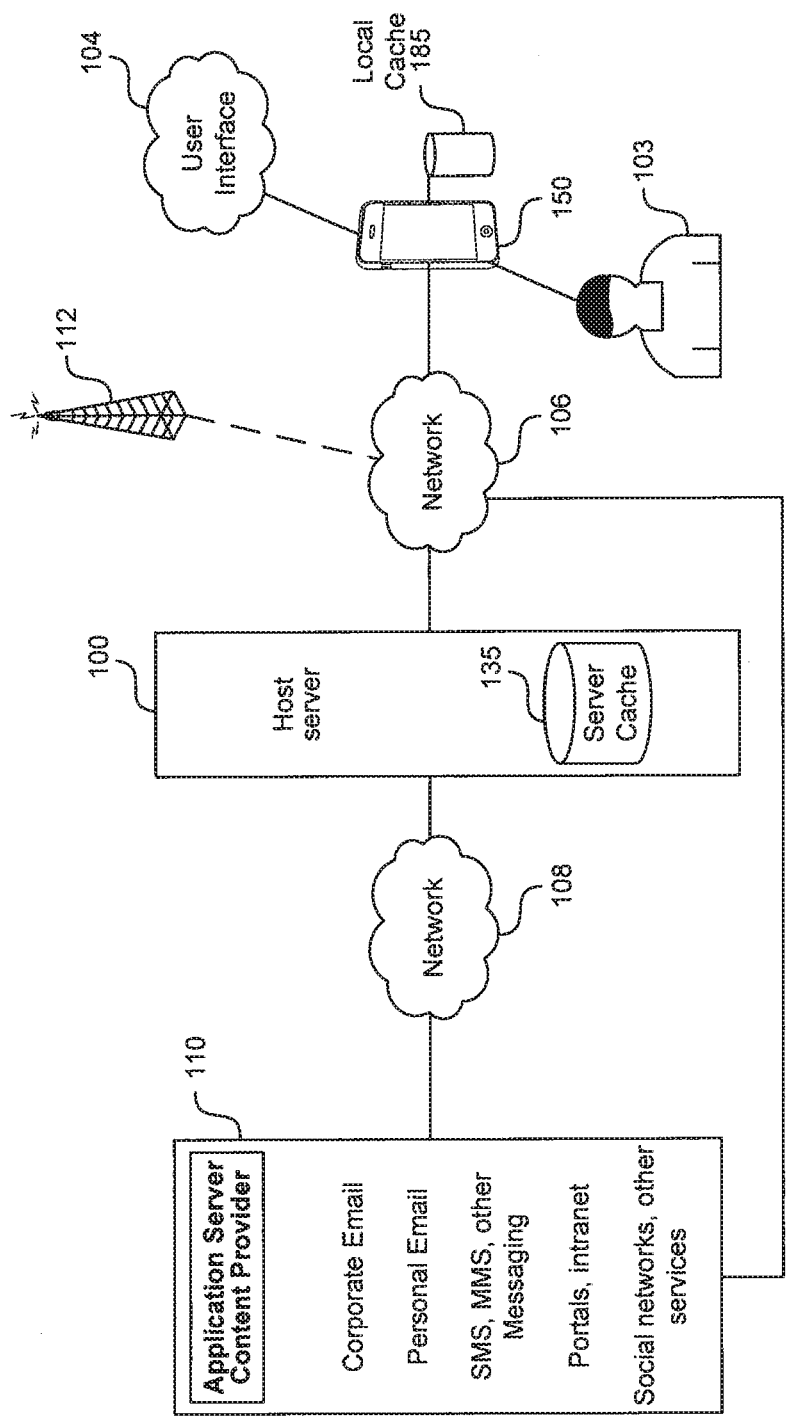
FIG. 1A illustrates an example diagram of a system where a host server facilitates management of traffic between client devices and an application server or content provider in a wireless network for resource conservation.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for mobile application traffic optimization.

One embodiment of the disclosed technology includes, a system that optimizes multiple aspects of the connection with wired and wireless networks and devices through a comprehensive view of device and application activity including: loading, current application needs on a device, controlling the type of access (push vs. pull or hybrid), location, concentration of users in a single area, time of day, how often the user interacts with the application, content or device, and using this information to shape traffic to a cooperative client/server or simultaneously mobile devices without a cooperative client. Because the disclosed server is not tied to any specific network provider it has visibility into the network performance across all service providers. This enables optimizations to be applied to devices regardless of the operator or service provider, thereby enhancing the user experience and managing network utilization while roaming. Bandwidth has been considered a major issue in wireless networks today. More and more research has been done related to the need for additional bandwidth to solve access problems—many of the performance enhancing solutions and next generation standards, such as those commonly referred to as 4G, namely LTE, 4G, and WiMAX are focused on providing increased bandwidth. Although partially addressed by the standards a key problem that remains is lack of bandwidth on the signaling channel more so than the data channel.

Embodiments of the disclosed technology includes, for example, alignment of requests from multiple applications to minimize the need for several polling requests; leverage specific content types to determine how to proxy/manage a connection/content; and apply specific heuristics associated with device, user behavioral patterns (how often they interact with the device/application) and/or network parameters.

Embodiments of the present technology can further include, moving recurring HTTP polls performed by various widgets, RSS readers, etc., to remote network node (e.g., Network operation center (NOC)), thus considerably lowering device battery/power consumption, radio channel signaling, and bandwidth usage. Additionally, the offloading can be performed transparently so that existing applications do not need to be changed.

In some embodiments, this can be implemented using a local proxy on the mobile device which automatically detects recurring requests for the same content (RSS feed, Widget data set) that matches a specific rule (e.g. happens every 15 minutes). The local proxy can automatically cache the content on the mobile device while delegating the polling to the server (e.g., a proxy server operated as an element of a communications network). The server can then notify the mobile/client proxy if the content changes, and if content has not changed (or not changed sufficiently, or in an identified manner or amount) the mobile proxy provides the latest version in its cache to the user (without need to utilize the radio at all). This way the mobile device (e.g., a mobile phone, smart phone, etc.) does not need to open up (e.g., thus powering on the radio) or use a data connection if the request is for content that is monitored and that has been not flagged as new, changed, or otherwise different.

The logic for automatically adding content sources/application servers (e.g., including URLs/content) to be monitored can also check for various factors like how often the content is the same, how often the same request is made (is there a fixed interval/pattern?), which application is requesting the data, etc. Similar rules to decide between using the cache and request the data from the original source may also be implemented and executed by the local proxy and/or server.

For example, when the request comes at an unscheduled/unexpected time (user initiated check), or after every (n) consecutive times the response has been provided from the cache, etc., or if the application is running in the background vs. in a more interactive mode of the foreground. As more and more mobile applications base their features on resources available in the network, this becomes increasingly important. In addition, the disclosed technology allows elimination of unnecessary chatter from the network, benefiting the operators trying to optimize the wireless spectrum usage.

FIG. 1A illustrates an example diagram of a system where a host server 100 facilitates management of traffic between client devices 102 and an application server or content provider 110 in a wireless network for resource conservation.

The client devices 102A-D can be any system and/or device, and/or any combination of devices/systems that is able to establish a connection, including wired, wireless, cellular connections with another device, a server and/or other systems such as host server 100 and/or application server/content provider 110. Client devices 102 will typically include a display and/or other output functionalities to present information and data exchanged between among the devices 102 and/or the host server 100 and/or application server/content provider 110.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Palm device, a handheld tablet (e.g. an iPad or any other tablet), a hand held console, a hand held gaming device or console, any SuperPhone such as the iPhone, and/or any other portable, mobile, hand held devices, etc. In one embodiment, the client devices 102, host server 100, and app server 110 are coupled via a network 106 and/or a network 108. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology in acquiring context awareness at the client device 102. Context awareness at client devices 102 generally includes, by way of example but not limitation, client device 102 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 102). In addition to application context awareness as determined from the client 102 side, the application context awareness may also be received from or obtained/queried from the respective application/service providers 110 (by the host 100 and/or client devices 102).

The host server 100 can use, for example, contextual information obtained for client devices 102, networks 106/108, applications (e.g., mobile applications), application server/provider 110, or any combination of the above, to manage the traffic in the system to satisfy data needs of the client devices 102 (e.g., to satisfy application or any other request including HTTP request). In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device 102 side resources (e.g., including but not limited to battery power consumption, radio use, processor/memory use) are optimized with a general philosophy for resource conservation while still optimizing performance and user experience.

For example, in context of battery conservation, the device 150 can observe user activity (for example, by observing user keystrokes, backlight status, or other signals via one or more input mechanisms, etc.) and alters device 102 behaviors. The device 150 can also request the host server 100 to alter the behavior for network resource consumption based on user activity or behavior.

In one embodiment, the traffic management for resource conservation is performed using a distributed system between the host server 100 and client device 102. The distributed system can include proxy server and cache components on the server 100 side and on the client 102 side, for example, as shown by the server cache 135 on the server 100 side and the local cache 150 on the client 102 side.

Functions and techniques disclosed for context aware traffic management for resource conservation in networks (e.g., network 106 and/or 108) and devices 102, reside in a distributed proxy and cache system. The proxy and cache system can be distributed between, and reside on, a given client device 102 in part or in whole and/or host server 100 in part or in whole. The distributed proxy and cache system are illustrated with further reference to the example diagram shown in FIG. 1B. Functions and techniques performed by the proxy and cache components in the client device 102, the host server 100, and the related components therein are described, respectively, in detail with further reference to the examples of FIG. 2-3.

In one embodiment, client devices 102 communicate with the host server 100 and/or the application server 110 over network 106, which can be a cellular network. To facilitate overall traffic management between devices 102 and various application servers/content providers 110 to implement network (bandwidth utilization) and device resource (e.g., battery consumption), the host server 100 can communicate with the application server/providers 110 over the network 108, which can include the Internet.

In general, the networks 106 and/or 108, over which the client devices 102, the host server 100, and/or application server 110 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, Open System Interconnections (OSI), FTP, UPnP, iSCSI, NSF, ISDN, PDH, RS-232, SDH, SONET, etc.

The networks 106 and/or 108 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

Figure 1B:
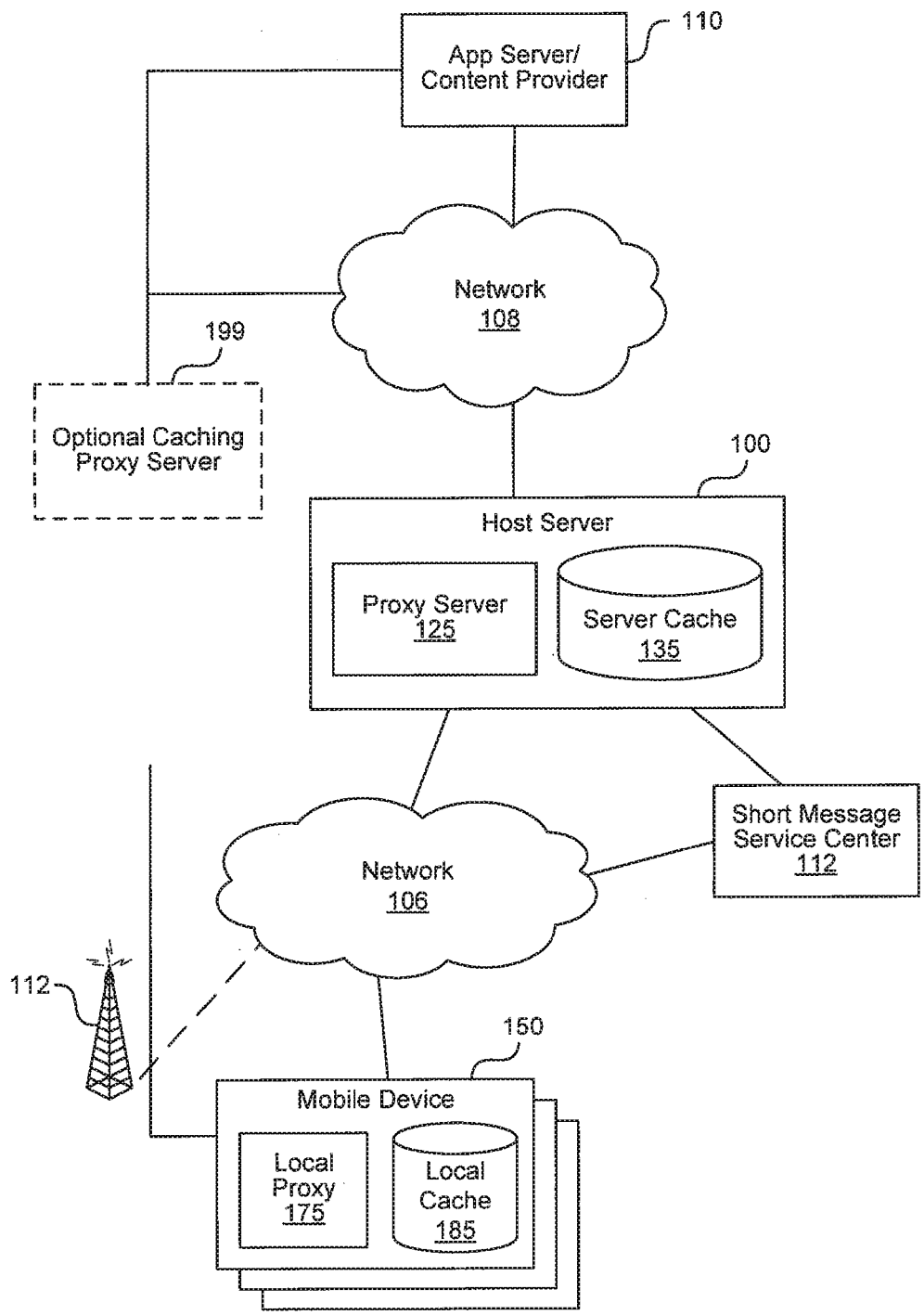
FIG. 1B illustrates an example diagram of a proxy and cache system distributed between the host server and device which facilitates network traffic management between a device and an application server/content provider for resource conservation.

FIG. 1B illustrates an example diagram of a proxy and cache system distributed between the host server 100 and device 150 which facilitates network traffic management between the device 150 and an application server/content provider 100 (e.g., a source server) for resource conservation.

The distributed proxy and cache system can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation in a network (e.g., cellular or other wireless networks), characteristics of user activity/behavior and/or application behavior at a mobile device 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150.

In addition, the local proxy 175 can identify and retrieve mobile device properties including, one or more of, battery level, network that the device is registered on, radio state, whether the mobile device is being used (e.g., interacted with by a user). In some instances, the local proxy 175 can delay, expedite (prefetch), and/or modify data prior to transmission to the proxy server 125, when appropriate, as will be further detailed with references to the description associated with the examples of FIG. 2-3.

The local database 185 can be included in the local proxy 175 or coupled to the proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the app server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices.

In general, the local proxy 175 and the proxy server 125 are transparent to the multiple applications executing on the mobile device. The local proxy 175 is generally transparent to the operating system or platform of the mobile device and may or may not be specific to device manufacturers. For example, he local proxy can be implemented without adding a TCP stack and thus act transparently to both the US and the mobile applications. In some instances, the local proxy 175 is optionally customizable in part or in whole to be device specific. In some embodiments, the local proxy 175 may be bundled into a wireless model, into a firewall, and/or a router.

In one embodiment, the host server 100 can in some instances, utilize the store and forward functions of a short message service center (SMSC) 112, such as that provided by the network service provider 112, in communicating with the device 150 in achieving network traffic management. As will be further described with reference to the example of FIG. 3, the host server 100 can forward content or HTTP responses to the SMSC 112 such that it is automatically forwarded to the device 150 if available, and for subsequent forwarding if the device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously.

Figure 2:
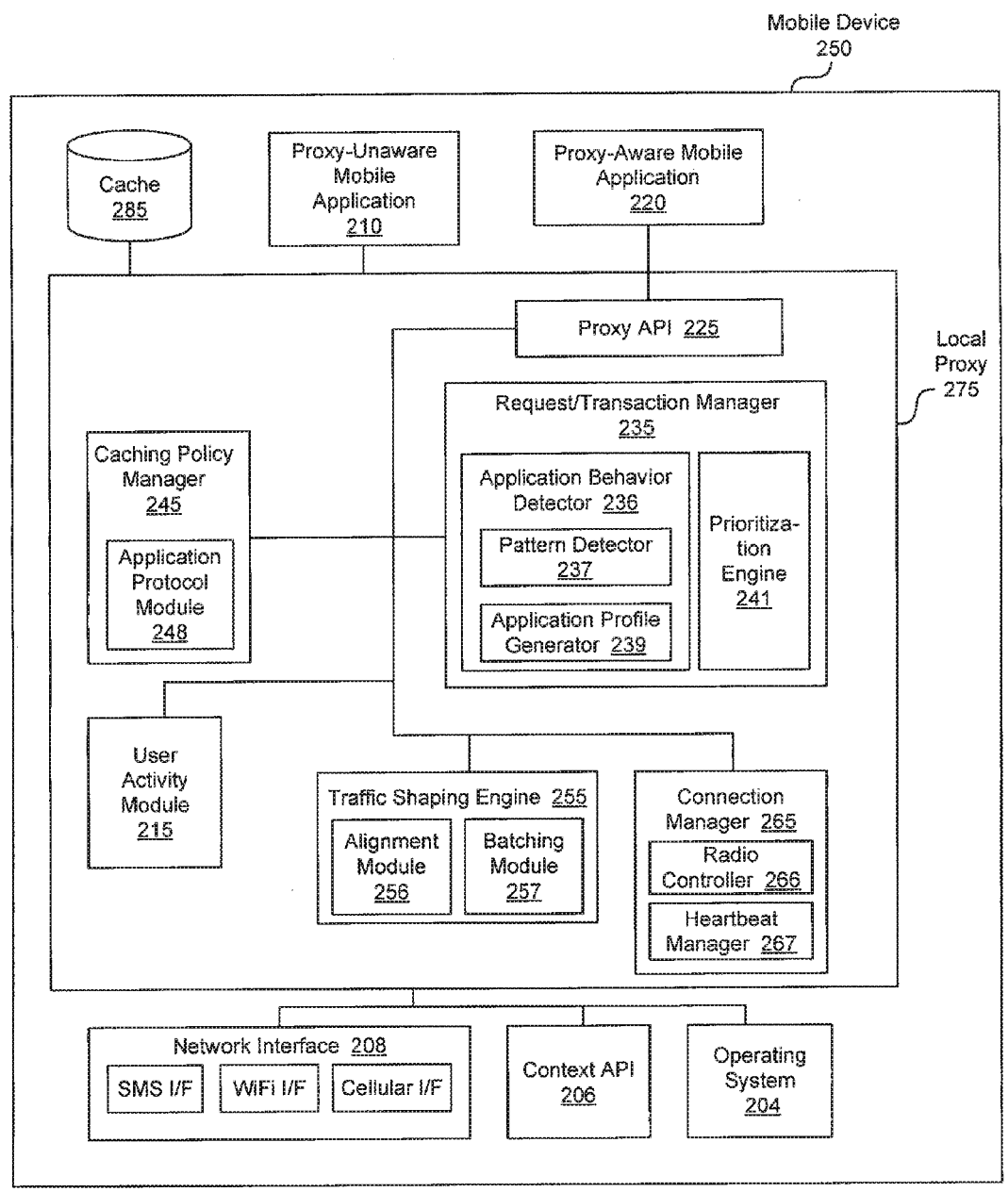
FIG. 2 depicts a block diagram illustrating an example of client-side components in a distributed proxy and cache system residing on a mobile device that manages traffic in a wireless network for resource conservation.

FIG. 2 depicts a block diagram illustrating an example of client-side components in a distributed proxy and cache system residing on a device 250 that manages traffic in a wireless network for resource conservation.

The device 250, which can be a portable or mobile device, such as a portable phone, generally includes, for example, a network interface 208, an operating system 204, a context API 206, and mobile applications which may be proxy unaware 210 or proxy aware 220. Note that the device 250 is specifically illustrated in the example of FIG. 2 as a mobile device, such is not a limitation and that device 250 may be any portable/mobile or non-portable device able to receive, transmit signals to satisfy data requests over a network including wired or wireless networks (e.g., WiFi, cellular, Bluetooth, etc.).

The network interface 208 can be a networking module that enables the device 250 to mediate data in a network with an entity that is external to the host server 250, through any known and/or convenient communications protocol supported by the host and the external entity. The network interface 208 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, or whether or not the connection is via a router, an access point, a wireless router, a switch, a multilayer switch, a protocol converter, a gateway, a bridge, bridge router, a hub, a digital media receiver, and/or a repeater.

Device 250 can further include, client-side components of the distributed proxy and cache system which can include, a local proxy 275 (e.g., a mobile client of a mobile device) and a cache 285. In one embodiment, the local proxy 275 includes a user activity module 215, a proxy API 225, a request/transaction manager 235, a caching policy manager 245, a traffic shaping engine 255, and/or a connection manager 265. The traffic shaping engine 255 may further include an alignment module 256 and/or a batching module 257, the connection manager 265 may further include a radio controller 266. The request/transaction manager 235 can further include an application behavior detector 236 and/or a prioritization engine 238, the application behavior detector 236 may further include a pattern detector 237 and/or and application profile generator 238. Additional or less components/modules/engines can be included in the local proxy 275 and each illustrated component.

As used herein, a "module," "a manager," a "handler," a "detector," an "interface," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, a portion of the distributed proxy and cache system for network traffic management resides in or is in communication with device 250, including local proxy 275 (mobile client) and/or cache 285. The local proxy 275 can provide an interface on the device 150 for users to access device applications and services including email, IM, voice mail, visual voicemail, feeds, Internet, other applications, etc.

Figure 3:
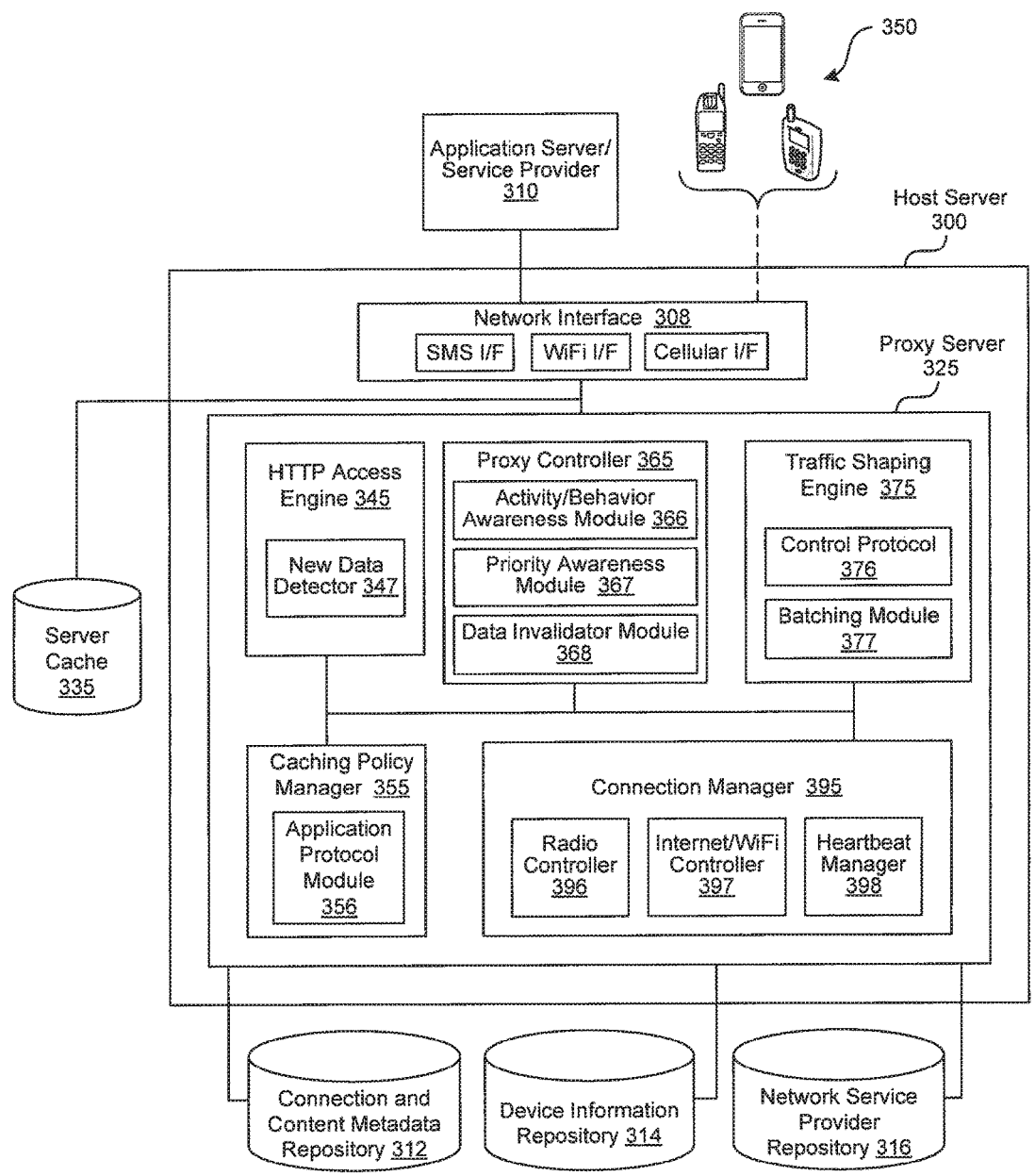
FIG. 3 depicts a block diagram illustrating an example of server-side components in a distributed proxy and cache system that manages traffic in a wireless network for resource conservation.

The proxy 275 is generally application independent and can be used by applications (e.g., both proxy aware and proxy-unaware mobile applications 210 and 220) to open TCP connections to a remote server (e.g., the server 100 in the examples of FIGS. 1A-1B and/or server proxy 125/325 shown in the examples of FIG. 1B and FIG. 3). In some instances, the local proxy 275 includes a proxy API 225 which can be optionally used to interface with proxy-aware applications 220 (or mobile applications on a mobile device).

The applications 210 and 220 can generally include any user application, widgets, software, HTTP-based application, web browsers, video or other multimedia streaming or downloading application, video games, social network applications, email clients, RSS management applications, application stores, document management applications, productivity enhancement applications, etc. The applications can be provided with the device OS, by the device manufacturer, by the network service provider, downloaded by the user, or provided by others.

One embodiment of the local proxy 275 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the device 250, or for a specific time period (e.g., for the last 2 hours, for the last 5 hours).

Additionally, characteristic profiles can be generated by the user activity module 215 to depict a historical trend for user activity and behavior (e.g. 1 week, 1 mo, 2 mo, etc.). Such historical profiles can also be used to deduce trends of user behavior, for example, access frequency at different times of day, trends for certain days of the week (weekends or week days), user activity trends based on location data (e.g., IP address, GPS, or cell tower coordinate data) or changes in location data (e.g., user activity based on user location, or user activity based on whether the user is on the go, or traveling outside a home region, etc.) to obtain user activity characteristics.

In one embodiment, user activity module 215 can detect and track user activity with respect to applications, documents, files, windows, icons, and folders on the device 250. For example, the user activity module 215 can detect when an application or window (e.g., a web browser) has been exited, closed, minimized, maximized, opened, moved into the foreground, or into the background, multimedia content playback, etc.

In one embodiment, characteristics of the user activity on the device 250 can be used to locally adjust behavior of the device (e.g., mobile device) to optimize its resource consumption such as battery/power consumption and more generally, consumption of other device resources including memory, storage, and processing power. In one embodiment, the use of a radio on a device can be adjusted based on characteristics of user behavior (e.g., by the radio controller 266 of the connection manager 265) coupled to the user activity module 215. For example, the radio controller 266 can turn the radio on or off, based on characteristics of the user activity on the device 250. In addition, the radio controller 266 can adjust the power mode of the radio (e.g., to be in a higher power mode or lower power mode) depending on characteristics of user activity.

In one embodiment, characteristics of the user activity on device 250 can also be used to cause another device (e.g., other computers, a mobile device, or a non-portable device) or server (e.g., host server 100 and 300 in the examples of FIGS. 1A-B and FIG. 3) which can communicate (e.g., via a cellular or other network) with the device 250 to modify its communication frequency with the device 250. The local proxy 275 can use the characteristics information of user behavior determined by the user activity module 215 to instruct the remote device as to how to modulate its communication frequency (e.g., decreasing communication frequency, such as data push frequency if the user is idle, requesting that the remote device notify the device 250 if new data, changed data, different data, or data of a certain level of importance becomes available, etc.).

In one embodiment, the user activity module 215 can, in response to determining that user activity characteristics indicate that a user is active after a period of inactivity, request that a remote device (e.g., server host server 100 and 300 in the examples of FIGS. 1A-B and FIG. 3) send the data that was buffered as a result of the previously decreased communication frequency.

In addition, or in alternative, the local proxy 275 can communicate the characteristics of user activity at the device 250 to the remote device (e.g., host server 100 and 300 in the examples of FIGS. 1A-B and FIG. 3) and the remote device determines how to alter its own communication frequency with the device 250 for network resource conservation and conservation of device 250 resources.

One embodiment of the local proxy 275 further includes a request/transaction manager 235, which can detect, identify, intercept, process, manage, data requests initiated on the device 250, for example, by applications 210 and/or 220, and/or directly/indirectly by a user request. The request/transaction manager 235 can determine how and when to process a given request or transaction, or a set of requests/transactions, based on transaction characteristics.

The request/transaction manager 235 can prioritize requests or transactions made by applications and/or users at the device 250, for example by the prioritization engine 238.

Importance or priority of requests/transactions can be determined by the manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

In addition, transaction characteristics can also depend on whether the transaction was a result of user-interaction or other user initiated action on the device (e.g., user interaction with a mobile application). In general, a time critical transaction can include a transaction resulting from a user-initiated data transfer, and can be prioritized as such. Transaction characteristics can also depend on the amount of data that will be transferred or is anticipated to be transferred as a result of the request/requested transaction. For example, the connection manager 265, can adjust the radio mode (e.g., high power or low power mode via the radio controller 266) based on the amount of data that will need to be transferred.

In addition, the radio controller 266/connection manager 265 can adjust the radio power mode (high or low) based on time criticality/sensitivity of the transaction. The radio controller 266 can trigger the use of high power radio mode when a time-critical transaction (e.g., a transaction resulting from a user-initiated data transfer, an application running in the foreground, any other event meeting a certain criteria) is initiated or detected.

In general, the priorities can be set by default, for example, based on device platform, device manufacturer, operating system, etc. Priorities can alternatively or in additionally be set by the particular application; for example, the Facebook mobile application can set its own priorities for various transactions (e.g., a status update can be of higher priority than an add friend request or a poke request, a message send request can be of higher priority than a message delete request, for example), an email client or IM chat client may have its own configurations for priority. The prioritization engine 238 may include set of rules for assigning priority.

The priority engine 238 can also track network provider limitations or specifications on application or transaction priority in determining an overall priority status for a request/transaction. Furthermore, priority can in part or in whole be determined by user preferences, either explicit or implicit. A user, can in general, set priorities at different tiers, such as, specific priorities for sessions, or types, or applications (e.g., a browsing session, a gaming session, versus an IM chat session, the user may set a gaming session to always have higher priority than an IM chat session, which may have higher priority than web-browsing session). A user can set application-specific priorities, (e.g., a user may set Facebook related transactions to have a higher priority than LinkedIn related transactions), for specific transaction types (e.g., for all send message requests across all applications to have higher priority than message delete requests, for all calendar-related events to have a high priority, etc.), and/or for specific folders.

The priority engine 238 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, a manual sync request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, a graded representation and all are considered to be within the scope of the disclosed technology.

TABLE I

| Change (initiated on device) | Priority | Change (initiated on server) | Priority |
|---|---|---|---|
| Send email | High | Receive email | High |
| Delete email | Low | Edit email | Often not possible to sync (Low if possible) |
| (Un)read email | Low | | |
| Move message | Low | New email in deleted items | Low |
| Read more | High | | |
| Down load attachment | High | Delete an email | Low |
| | | (Un)Read an email | Low |
| New Calendar event | High | Move messages | Low |
| Edit/change | High | Any calendar change | High |
| Calendar event | | Any contact change | High |
| Add a contact | High | Wipe/lock device | High |
| Edit a contact | High | Settings change | High |
| Search contacts | High | Any folder change | High |
| Change a setting | High | Connector restart | High (if no changes nothing is sent) |
| Manual send/receive | High | | |
| IM status change | Medium | Social Network Status Updates | Medium |
| Auction outbid or change notification | High | Sever Weather Alerts | High |
| Weather Updates | Low | News Updates | Low |

Table I above shows, for illustration purposes, some examples of transactions with examples of assigned priorities in a binary representation scheme. Additional assignments are possible for additional types of events, requests, transactions, and as previously described, priority assignments can be made at more or less granular levels, e.g., at the session level or at the application level, etc.

As shown by way of example in the above table, in general, lower priority requests/transactions can include, updating message status as being read, unread, deleting of messages, deletion of contacts; higher priority requests/transactions, can in some instances include, status updates, new IM chat message, new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages), are generally considered low priority and absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate a message delete from the device 250 the moment that the message has exceeded 7 days old, the message is deleted when the radio is powered on next. If the radio is already on, then pruning may occur as regularly scheduled.

The request/transaction manager 235, can use the priorities for requests (e.g., by the prioritization engine 238) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such a request can be sent when a request for a transaction is detected to be over a certain priority level.

In one embodiment, priority assignments (such as that determined by the local proxy 275 or another device/entity) can be used cause a remote device to modify its communication with the frequency with the mobile device. For example, the remote device can be configured to send notifications to the device 250 when data of higher importance is available to be sent to the mobile device.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257). In one embodiment, the priorities can be set, configured, or readjusted by a user. For example, content depicted in Table I in the same or similar form can be accessible in a user interface on the device 250 and for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the cumulated low priority events when a higher priority event is initiated or detected at the device 250. Batch transfer can otherwise be initiated when radio use is triggered for another reason (e.g., to receive data from a remote device such as host server 100 or 300). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

In one embodiment, the local proxy 275 locally adjusts radio use on the device 250 by caching data in the cache 285. When requests or transactions from the device 250 can be satisfied by content stored in the cache 285, the radio controller 266 need not activate the radio to send the request to a remote entity (e.g., the host server 100, 300, as shown in FIG. 1 and FIG. 3 or a content provider/application server such as the server/provider 110 shown in the examples of FIG. 1A and FIG. 1B). As such, the local proxy 275 can use the local cache 285 and the cache policy manager 245 to locally store data for satisfying data requests to eliminate or reduce the use of the device radio for conservation of network resources and device battery consumption.

In leveraging the local cache, once the request/transaction manager 225 intercepts a data request by an application on the device 250, the local repository 285 can be queried to determine if there is any locally stored response, and also determine whether the response is valid. When a valid response is available in the local cache 285, the response can be provided to the application on the device 250 without the device 250 needing to access the cellular network.

If a valid response is not available, the local proxy 275 can query a remote proxy (e.g., the server proxy 325 of FIG. 3) to determine whether a remotely stored response is valid. If so, the remotely stored response (e.g., which may be stored on the server cache 135 or optional caching server 199 shown in the example of FIG. 1B) can be provided to the mobile device, possibly without the mobile device 250 needing to access the cellular network, thus relieving consumption of network resources.

If a valid cache response is not available, or if cache responses are unavailable for the intercepted data request, the local proxy 275, for example, the caching policy manager 245, can send the data request to a remote proxy (e.g., server proxy 325 of FIG. 3) which forwards the data request to a content source (e.g., application server/content provider 110 of FIG. 1) and a response from the content source can be provided through the remote proxy, as will be further described in the description associated with the example host server 300 of FIG. 3. The cache policy manager 245 can manage or process requests that use a variety of protocols, including but not limited to HTTP, HTTPS, IMAP, POP, SMTP and/or ActiveSync. The caching policy manager 245 can locally store responses for data requests in the local database 285 as cache entries, for subsequent use in satisfying same or similar data requests. The manager 245 can request that the remote proxy monitor responses for the data request, and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, different response, etc.) to the data request. In one embodiment, the caching policy manager 245 is able to detect or identify the protocol used for a specific request, including but not limited to HTTP, HTTPS, IMAP, POP, SMTP and/or ActiveSync. In one embodiment, application specific handlers (e.g., via the application protocol module 246 of the manager 245) on the local proxy 275 allows for optimization of any protocol that can be port mapped to a handler in the distributed proxy (e.g., port mapped on the proxy server 325 in the example of FIG. 3).

In one embodiment, the local proxy 275 notifies the remote proxy such that the remote proxy can monitor responses received for the data request from the content source for changed results prior to returning the result to the device 250, for example, when the data request to the content source has yielded same results to be returned to the mobile device. In general, the local proxy 275 can simulate application server responses for applications on the device 250, using locally cached content. This can prevent utilization of the cellular network for transactions where new/changed/different data is not available, thus freeing up network resources and preventing network congestion.

In one embodiment, the local proxy 275 includes an application behavior detector 236 to track, detect, observe, monitor, applications (e.g., proxy aware and/or unaware applications 210 and 220) accessed or installed on the device 250. Application behaviors, or patterns in detected behaviors (e.g., via the pattern detector 237) of one or more applications accessed on the device 250 can be used by the local proxy 275 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), mobile device parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110 of FIG. 1) that would result from the application requests that would be performed at the mobile device 250 to be performed instead, by a proxy server (e.g., proxy server 125 of FIG. 1B or proxy server 325 of FIG. 3) remote from the device 250. Traffic engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular) connection with the content source for repetitive content polls.

As a result of the offloading of the polling, locally cached content stored in the local cache 285 can be provided to satisfy data requests at the device 250, when content change is not detected in the polling of the content sources. As such, when data has not changed, application data needs can be satisfied without needing to enable radio use or occupying cellular bandwidth in a wireless network. When data has changed, or when data is different, and/or new data has been received, the remote entity to which polling is offloaded, can notify the device 250. The remote entity may be the host server 300 as shown in the example of FIG. 3.

In one embodiment, the local proxy 275 can mitigate the need/use of periodic keep-alive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keep-alive) messages being sent from applications.

The heartbeat manager 267 can prevent any or all of these heartbeat messages from being sent over the cellular, or other network, and instead rely on the server component of the distributed proxy system (e.g., shown in FIG. 1B) to generate the and send the heartbeat messages to maintain a connection with the backend (e.g., app server/provider 110 in the example of FIG. 1).

The local proxy 275 generally represents any one or a portion of the functions described for the individual managers, modules, and/or engines. The local proxy 275 and device 250 can include additional or less components; more or less functions can be included, in whole or in part, without deviating from the novel art of the disclosure.

FIG. 3 depicts a block diagram illustrating an example of server-side components in a distributed proxy and cache system residing on a host server 300 that manages traffic in a wireless network for resource conservation.

The host server 300 generally includes, for example, a network interface 308 and/or one or more repositories 312, 314, 316. Note that server 300 may be any portable/mobile or non-portable device, server, cluster of computers and/or other types of processing units (e.g., any number of a machine shown in the example of FIG. 11) able to receive, transmit signals to satisfy data requests over a network including any wired or wireless networks (e.g., WiFi, cellular, Bluetooth, etc.).

The network interface 308 can include networking module(s) or devices(s) that enable the server 300 to mediate data in a network with an entity that is external to the host server 300, through any known and/or convenient communications protocol supported by the host and the external entity. Specifically, the network interface 308 allows the server 308 to communicate with multiple devices including mobile phone devices 350, and/or one or more application servers/content providers 310.

The host server 300 can store information about connections (e.g., network characteristics, conditions, types of connections, etc.) with devices in the connection metadata repository 312. Additionally, any information about third party application or content providers can also be stored in 312. The host server 300 can store information about devices (e.g., hardware capability, properties, device settings, device language, network capability, manufacturer, device model, OS, OS version, etc.) in the device information repository 314. Additionally, the host server 300 can store information about network providers and the various network service areas in the network service provider repository 316.

The communication enabled by 308 allows for simultaneous connections (e.g., including cellular connections) with devices 350 and/or connections (e.g., including wired/wireless, HTTP, Internet connections, LAN, Wifi, etc.) with content servers/providers 310, to manage the traffic between devices 350 and content providers 310, for optimizing network resource utilization and/or to conserver power (battery) consumption on the serviced devices 350. The host server 300 can communicate with mobile devices 350 serviced by different network service providers and/or in the same/different network service areas. The host server 300 can operate and is compatible with devices 350 with varying types or levels of mobile capabilities, including by way of example but not limitation, 1G, 2G, 2G transitional (2.5G, 2.75G), 3G (IMT-2000), 3G transitional (3.5G, 3.75G, 3.9G), 4G (IMT-advanced), etc.

In general, the network interface 308 can include one or more of a network adaptor card, a wireless network interface card (e.g., SMS interface, WiFi interface, interfaces for various generations of mobile communication standards including but not limited to 1G, 2G, 3G, 3.5G, 4G type networks such as, LTE, WiMAX, etc.), Bluetooth, WiFi, or any other network whether or not connected via a a router, an access point, a wireless router, a switch, a multilayer switch, a protocol converter, a gateway, a bridge, bridge router, a hub, a digital media receiver, and/or a repeater.

The host server 300 can further include, server-side components of the distributed proxy and cache system which can include, a proxy server 325 and a server cache 335. In one embodiment, the server proxy 325 can include an HTTP access engine 345, a caching policy manager 355, a proxy controller 365, a traffic shaping engine 375, a new data detector 386, and/or a connection manager 395.

The HTTP access engine 345 may further include a heartbeat manager 346, the proxy controller 365 may further include a data invalidator module 366, the traffic shaping engine 375 may further include a control protocol 276 and a batching module 377. Additional or less components/modules/engines can be included in the proxy server 325 and each illustrated component.

As used herein, a "module," "a manager," a "handler," a "detector," an "interface," a "controller," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, handler, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In the example of a device (e.g., mobile device 350) making an application or content request to an app server or content provider 310, the request may be intercepted and routed to the proxy server 325, which is coupled to the device 350 and the provider 310. Specifically, the proxy server is able to communicate with the local proxy (e.g., proxy 175 and 275 of the examples of FIG. 1 and FIG. 2 respectively) of the device 350, the local proxy forwards the data request to the proxy server 325 for, in some instances, further processing, and if needed, for transmission to the content server 310 for a response to the data request.

In such a configuration, the host 300, or the proxy server 325 in the host server 300 can utilize intelligent information provided by the local proxy in adjusting its communication with the device in such a manner that optimizes use of network and device resources. For example, the proxy server 325 can identify characteristics of user activity on the device 350 to modify its communication frequency. The character-istics of user activity can be determined by, for example, the activity/behavior awareness module 366 in the proxy controller 365, via information collected by the local proxy on the device 350.

In one embodiment, communication frequency can be controlled by the connection manager 396 of the proxy server 325, for example, to adjust push frequency of content or updates to the device 350. For instance, push frequency can be decreased by the connection manager 396 when characteristics of the user activity indicate that the user is inactive. In one embodiment, when the characteristics of the user activity indicate that the user is subsequently active after a period of inactivity, the connection manager 396 can adjust the communication frequency with the device 350 to send data that was buffered as a result of decreased communication frequency, to the device 350.

In addition, the proxy server 325 includes priority awareness of various requests, transactions, sessions, applications, and/or specific events. Such awareness can be determined by the local proxy on the device 350 and provided to the proxy server 325. The priority awareness module 367 of the proxy server 325 can generally assess the priority (e.g., including time-criticality, time-sensitivity, etc.) of various events or applications; additionally, the priority awareness module 367 can track priorities determined by local proxies of devices 350.

In one embodiment, through priority awareness, the connection manager 395 can further modify communication frequency (e.g., use or radio as controlled by the radio controller 396) of the server 300 with the devices 350. For example, the server 300 can notify the device 350, thus requesting use of the radio if it is not already in use, when data or updates of an importance/priority level which meets a criteria becomes available to be sent.

In one embodiment, the proxy server 325 can detect multiple occurrences of events (e.g., transactions, content, data received from server/provider 310) and allow the events to accumulate for batch transfer to device 350. Batch transfer can be cumulated and transfer of events can be delayed based on priority awareness and/or user activity/application behavior awareness, as tracked by modules 366 and/or 367. For example, batch transfer of multiple events (of a lower priority) to the device 350 can be initiated by the batching module 377 when an event of a higher priority (meeting a threshold or criteria) is detected at the server 300. In addition, batch transfer from the server 300 can be triggered when the server receives data from the device 350, indicating that the device radio is already in use and is thus on. In one embodiment, the proxy server 324 can order the each messages/packets in a batch for transmission based on event/transaction priority, such that higher priority content can be sent first, in case connection is lost or the battery dies, etc.

In one embodiment, the server 300 caches data (e.g., as managed by the caching policy manager 355) such that communication frequency over a network (e.g., cellular network) with the device 350 can be modified (e.g., decreased). The data can be cached, for example in the server cache 335, for subsequent retrieval or batch sending to the device 350 to potentially decrease the need to turn on the device 350 radio. The server cache 335 can be partially or wholly internal to the host server 300, although in the example of FIG. 3, it is shown as being external to the host 300. In some instances, the server cache 335 may be the same as and/or integrated in part or in whole with another cache managed by another entity (e.g., the optional caching proxy server 199 shown in the example of FIG. 1B), such as being managed by an application server/content provider 110, a network service provider, or another third party.

In one embodiment, content caching is performed locally on the device 350 with the assistance of host server 300. For example, proxy server 325 in the host server 300 can query the application server/provider 310 with requests and monitor changes in responses. When changed, different or new responses are detected (e.g., by the new data detector 347), the proxy server 325 can notify the mobile device 350, such that the local proxy on the device 350 can make the decision to invalidate (e.g., indicated as out-dated) the relevant cache entries stored as any responses in its local cache. Alternatively, the data invalidator module 368 can automatically instruct the local proxy of the device 350 to invalidate certain cached data, based on received responses from the application server/provider 310. The cached data is marked as invalid, and can get replaced or deleted when new content is received from the content server 310.

Note that data change can be detected by the detector 347 in one or more ways. For example, the server/provider 310 can notify the host server 300 upon a change. The change can also be detected at the host server 300 in response to a direct poll of the source server/provider 310. In some instances, the proxy server 325 can in addition, pre-load the local cache on the device 350 with the new/updated/changed/different data. This can be performed when the host server 300 detects that the radio on the mobile device is already in use, or when the server 300 has additional content/data to be sent to the device 350.

One or more the above mechanisms can be implemented simultaneously or adjusted/configured based on application (e.g., different policies for different servers/providers 310). In some instances, the source provider/server 310 may notify the host 300 for certain types of events (e.g., events meeting a priority threshold level). In addition, the provider/server 310 may be configured to notify the host 300 at specific time intervals, regardless of event priority.

In one embodiment, the proxy server 325 of the host 300 can monitor/track responses received for the data request from the content source for changed results prior to returning the result to the mobile device, such monitoring may be suitable when data request to the content source has yielded same results to be returned to the mobile device, thus preventing network/power consumption from being used when no new/changes are made to a particular requested. The local proxy of the device 350 can instruct the proxy server 325 to perform such monitoring or the proxy server 325 can automatically initiate such a process upon receiving a certain number of the same responses (e.g., or a number of the same responses in a period of time) for a particular request.

In one embodiment, the server 300, for example, through the activity/behavior awareness module 366, is able to identify or detect user activity, at a device that is separate from the mobile device 350. For example, the module 366 may detect that a user's message inbox (e.g., email or types of inbox) is being accessed. This can indicate that the user is interacting with his/her application using a device other than the mobile device 350 and may not need frequent updates, if at all.

The server 300, in this instance, can thus decrease the frequency with which new, different, changed, or updated content is sent to the mobile device 350, or eliminate all communication for as long as the user is detected to be using another device for access. Such frequency decrease may be application specific (e.g., for the application with which the user is interacting with on another device), or it may be a general frequency decrease (e.g., since the user is detected to be interacting with one server or one application via another device, he/she could also use it to access other services) to the mobile device 350.

In one embodiment, the host server 300 is able to poll content sources 310 on behalf of devices 350 to conserve power or battery consumption on devices 350. For example, certain applications on the mobile device 350 can poll its respective server 310 in a predictable recurring fashion. Such recurrence or other types of application behaviors can be tracked by the activity/behavior module 366 in the proxy controller 365. The host server 300 can thus poll content sources 310 for applications on the mobile device 350, that would otherwise be performed by the device 350 through a wireless (e.g., including cellular connectivity). The host server can poll the sources 310 for new, different, updated, or changed data by way of the HTTP access engine 345 to establish HTTP connection or by way of radio controller 396 to connect to the source 310 over the cellular network. When new, different, updated, or changed data is detected, the new data detector can notify the device 350 that such data is available and/or provide the new/changed data to the device 350.

In one embodiment, the connection manager 395 determines that the mobile device 350 is unavailable (e.g., the radio is turned off) and utilizes SMS to transmit content to the device 350, for instance via the SMSC shown in the example of FIG. 1B. SMS is used to transmit invalidation messages, batches of invalidation messages, or even content in the case the content is small enough to fit into just a few (usually one or two) SMS messages. This avoids the need to access the radio channel to send overhead information. The host server 300 can use SMS for certain transactions or responses having a priority level above a threshold or otherwise meeting a criteria. The server 300 can also utilize SMS as an out-of-band trigger to maintain or wake-up an IP connection as an alternative to maintaining an always-on IP connection.

In one embodiment, the connection manager 395 in the proxy server 325 (e.g., the heartbeat manager 398) can generate and/or transmit heartbeat messages on behalf of connected devices 350, to maintain a backend connection with a provider 310 for applications running on devices 350.

For example, in the distributed proxy system, local cache on the device 350 can prevent any or all heartbeat messages needed to maintain TCP/IP connections required for applications, from being sent over the cellular, or other network, and instead rely on the proxy server 325 on the host server 300 to generate and/or send the heartbeat messages to maintain a connection with the backend (e.g., app server/provider 110 in the example of FIG. 1). The proxy server can generate the keep-alive (heartbeat) messages independent of the operations of the local proxy on the mobile device.

The repositories 312, 314, and/or 316 can additionally store software, descriptive data, images, system information, drivers, and/or any other data item utilized by other components of the host server 300 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

Figure 4:
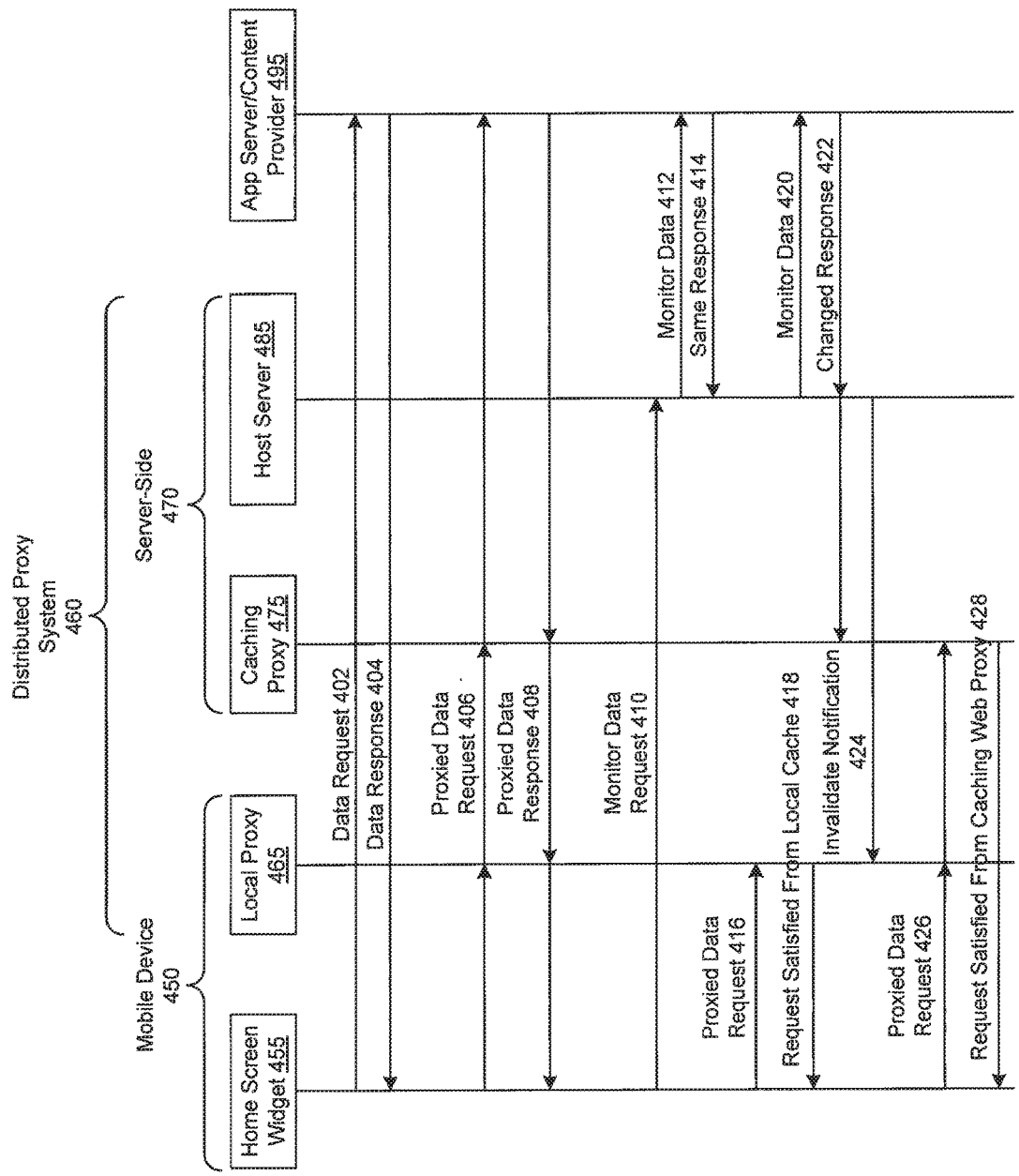
FIG. 4 depicts a diagram showing how data requests from a mobile device to an application server/content provider in a wireless network can be coordinated by a distributed proxy system in a manner such that network and battery resources are conserved through using content caching and monitoring performed by the distributed proxy system.

FIG. 4 depicts a diagram showing how data requests from a mobile device 450 to an application server/content provider 496 in a wireless network can be coordinated by a distributed proxy system 460 in a manner such that network and battery resources are conserved through using content caching and monitoring performed by the distributed proxy system 460.

In satisfying application or client requests on a mobile device 450 without the distributed proxy system 460, the mobile device 450, or the software widget executing on the device 450 performs a data request 402 (e.g., an HTTP GET, POST, or other request) directly to the application server 495 and receives a response 404 directly from the server/provider 495. If the data has been updated, the widget on the mobile device 450 can refreshes itself to reflect the update and waits for small period of time and initiates another data request to the server/provider 495.

In one embodiment, the requesting client or software widget 455 on the device 450 can utilize the distributed proxy system 460 in handling the data request made to server/provider 495. In general, the distributed proxy system 460 can include a local proxy 465 (which is typically considered a client-side component of the system 460 and can reside on the mobile device 450), a caching proxy (475, considered a server-side component 470 of the system 460 and can reside on the host server 485 or be wholly or partially external to the host server 485), a host server 485. The local proxy 465 can be connected to the proxy 475 and host server 485 via any network or combination of networks.

When the distributed proxy system 460 is used for data/application requests, the widget 455 can perform the data request 406 via the local proxy 465. The local proxy 465, can intercept the requests made by device applications, and can identify the connection type of the request (e.g., an HTTP get request or other types of requests). The local proxy 465 can then query the local cache for any previous information about the request (e.g., to determine whether a locally stored response is available and/or still valid). If a locally stored response is not available or if there is an invalid response stored, the local proxy 465 can update or store information about the request, the time it was made, and any additional data, in the local cache. The information can be updated for use in potentially satisfying subsequent requests.

The local proxy 465 can then send the request to the host server 485 and the server 485 can perform the request 406 and returns the results in response 408. The local proxy 465 can store the result and in addition, information about the result and returns the result to the requesting widget 455.

In one embodiment, if the same request has occurred multiple times (within a certain time period) and it has often yielded same results, the local proxy 465 can notify 410 the server 485 that the request should be monitored (e.g., steps 412 and 414) for result changes prior to returning a result to the local proxy 465 or requesting widget 455.

In one embodiment, if a request is marked for monitoring, the local proxy 465 can now store the results into the local cache. Now, when the data request 416, for which a locally response is available, is made by the widget 455 and intercepted at the local proxy 465, the proxy 465 can return the response 418 from the local cache without needing to establish a connection communication over the wireless network. In one embodiment, the response is stored at the server proxy in the server cache for subsequent use in satisfying same or similar data requests. The response can be stored in lieu of or in addition to storage on the local cache on the mobile device.

In addition, the server proxy performs the requests marked for monitoring 420 to determine whether the response 422 for the given request has changed. In general, the host server 485 can perform this monitoring independently of the widget 455 or local proxy 465 operations. Whenever an unexpected response 422 is received for a request, the server 485 can notify the local proxy 465 that the response has changed (e.g., the invalidate notification in step 424) and that the locally stored response on the client should be erased or replaced with a new (e.g., changed or different) response.

In this case, a subsequent data request 426 by the widget 455 from the device 450 results in the data being returned from host server 485 (e.g., via the caching proxy 475). Thus, through utilizing the distributed proxy system 460 the wireless (cellular) network is intelligently used when the content/data for the widget or software application 455 on the mobile device 450 has actually changed. As such, the traffic needed to check for the changes to application data is not performed over the wireless (cellular) network. This reduces the amount of generated network traffic and shortens the total time and the number of times the radio module is powered up on the mobile device 450, thus reducing battery consumption, and in addition, frees up network bandwidth.

Figure 5:
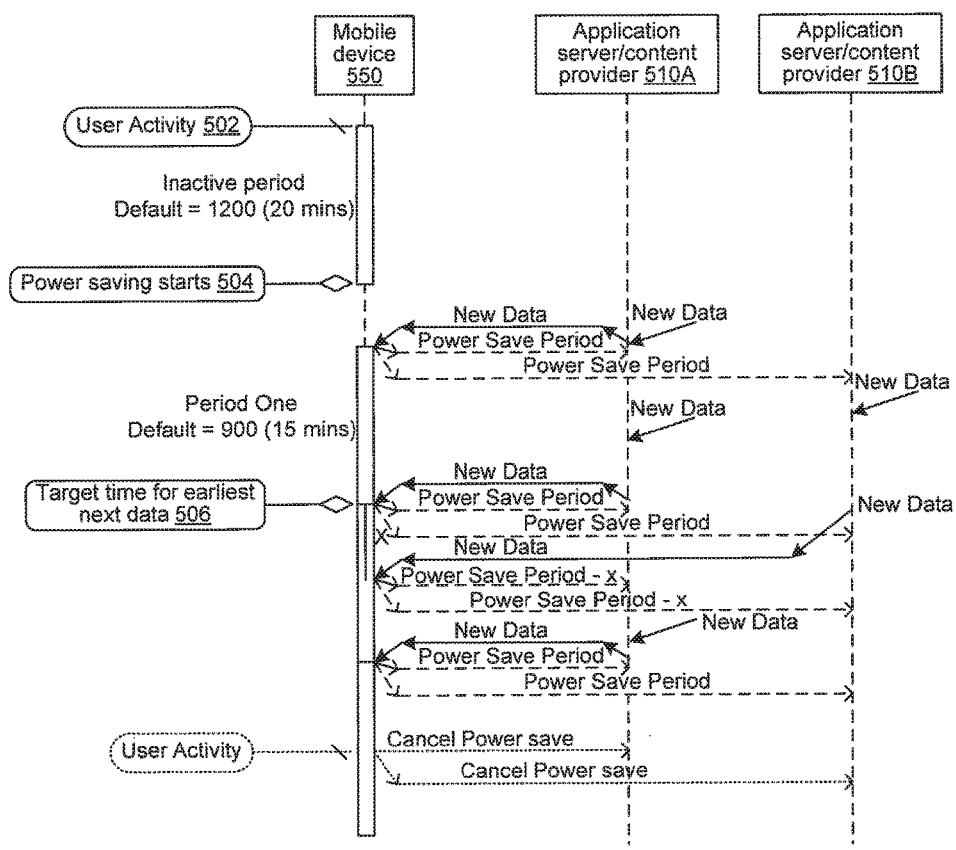
FIG. 5 depicts a diagram showing one example process for implementing a hybrid IP and SMS power saving mode on a mobile device using a distributed proxy and cache system (e.g., such as the distributed system shown in the example of FIG. 1B).

FIG. 5 depicts a diagram showing one example process for implementing a hybrid IP and SMS power saving mode on a mobile device 550 using a distributed proxy and cache system (e.g., such as the distributed system shown in the example of FIG. 1B).

In step 502, the local proxy (e.g., proxy 175 in the example of FIG. 1B) monitors the device for user activity. When the user is determined to be active, server push is active. For example, always-on-push IP connection can be maintained and if available, SMS triggers can be immediately sent to the mobile device 550 as it becomes available.

In process 504, after the user has been detected to be inactive or idle over a period of time (e.g., the example is shown for a period of inactivity of 20 min.), the local proxy can adjust the device to go into the power saving mode. In the power saving mode, when the local proxy receives a message or a correspondence from a remote proxy (e.g., the server proxy 135 in the example of FIG. 1B) on the server-side of the distributed proxy and cache system, the local proxy can respond with a call indicating that the device 550 is currently in power save mode (e.g., via a power save remote procedure call). In some instances, the local proxy can take the opportunity to notify multiple accounts or providers (e.g., 510A, and 510B) of the current power save status (e.g., timed to use the same radio power-on event).

In one embodiment, the response from the local proxy can include a time (e.g., the power save period) indicating to the remote proxy (e.g., server proxy 135) and/or the app server/providers 510A/B when the device 550 is next able to receive changes or additional data. A default power savings period can be set by the local proxy.

In one embodiment, if new, change, or different data or event is received before the end of any one power saving period, then the wait period communicated to the servers 510A/B can be the existing period, rather than an incremented time period. In response, the remote proxy server, upon receipt of power save notification from the device 550, can stop sending changes (data or SMSs) for the period of time requested (the wait period). At the end of the wait period, any notifications received can be acted upon and changes sent to the device 550, for example, as a single batched event or as individual events. If no notifications come in, then push can be resumed with the data or an SMS being sent to the device 550. The proxy server can time the poll or data collect event to optimize batch sending content to the mobile device 550 to increase the chance that the client will receive data at the next radio power on event.

Note that the wait period can be updated in operation in real time to accommodate operating conditions. For example, the local proxy can adjust the wait period on the fly to accommodate the different delays that occur in the system.

Detection of user activity 512 at the device 550 causes the power save mode to be exited. When the device 550 exits power save mode, it can begin to receive any changes associated with any pending notifications. If a power saving period has expired, then no power save cancel call may be needed as the proxy server will already be in traditional push operation mode.

In one embodiment, power save mode is not applied when the device 550 is plugged into a charger. This setting can be reconfigured or adjusted by the user or another party. In general, the power save mode can be turned on and off, for example, by the user via a user interface on device 550. In general, timing of power events to receive data can be synced with any power save calls to optimize radio use.

Figure 6:
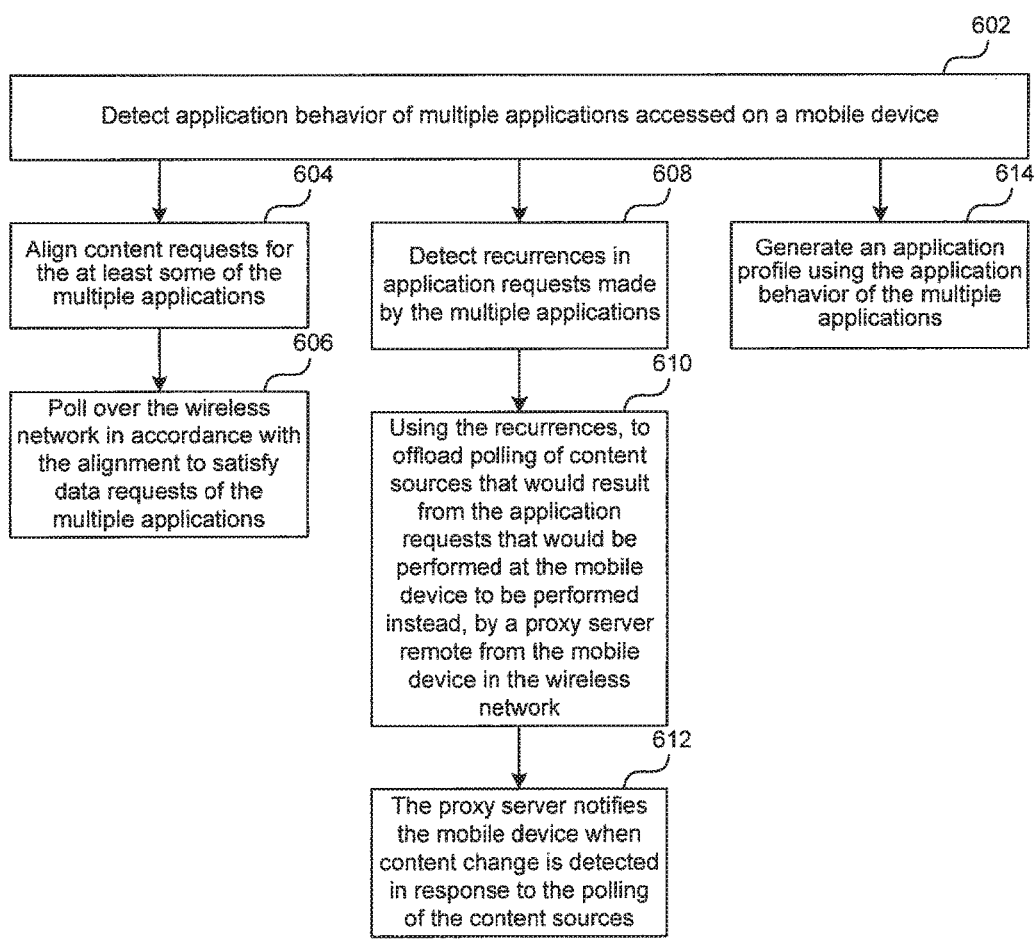
FIG. 6 depicts a flow chart illustrating example processes through which application behavior on a mobile device is used for traffic optimization.

FIG. 6 depicts a flow chart illustrating example processes through which application behavior on a mobile device is used for traffic optimization.

In process 602, application behavior of multiple applications accessed on a mobile device is detected. Using application behavior, the distributed proxy system can implement one or more of several processes for optimizing traffic.

For example, beginning in process 604, content requests for the at least some of the multiple applications are aligned and polling can be performed over the wireless network in accordance with the alignment to satisfy data requests of the multiple applications, in process 606. In one embodiment, content requests for some of the multiple applications can be aligned based on content types requested by the multiple applications. For example, content requests from different applications requesting RSS feeds can be aligned. In addition, content requests from different applications requesting content from the same sources may be aligned (e.g., a social networking application and a web page may both be requesting media content from an online video streaming site such as Youtube). In another example, multiple Facebook applications on one device (one from OEM, one from marketplace) that both poll for same data.

In addition, content requests can be aligned based on user's explicit and/or implicit preferences, user settings, mobile device parameters/parameters, and/or network parameters (e.g., network service provider specifications or limitations, etc.) or conditions (e.g., traffic, congestion, network outage, etc.). For example, when congestion is detected in a user's network service area, content requests can be aligned for the network is less congested. For example, when user is inactive, or when the battery is low, alignment may be performed more aggressively.

In some instances, the polling can be performed by the proxy server on behalf of multiple devices and can thus detect requests for polls from the same content source from multiple devices. The proxy server, can align such requests occurring around the same time (e.g., within a specific time period) for multiple devices and perform a poll of the source to satisfy the data needs of the multiple mobile devices. For example, during the Superbowl, the proxy server can detect a larger number of requests to poll ESPN.com or NFL.com for live score updates for the game. The proxy server can poll the content source once for a current score and provide the updates to each of the mobile devices that have applications which have (within a time period) requested polls for score updates.

In another example, beginning in process 608, recurrences in application requests made by the multiple applications are detected. Recurrences of application behavior can be identified by, for example, tracking patterns in application behavior.

Using the recurrences, polling of content sources as a result of the application requests that would be performed at the mobile device can now be offloaded, to be performed instead, for example, by a proxy server remote from the mobile device in the wireless network, in process 610. The application behavior can be tracked by, for example, a local proxy on the mobile device and communicated to the proxy server as connection metadata, for use in polling the content sources. The local proxy can delays or modifies data prior to transmission to the proxy serve and can additionally identify and retrieve mobile device properties including, one or more of, battery level, network that the device is registered on, radio state, whether the mobile device is being used. The offloading to the proxy server can be performed, for example, when the recurrences match a rule or criteria. In addition, the proxy server and/or the local proxy can delay the delivery of a response received from a content source and/or perform additional modification, etc. For example, the local proxy can delay the presentation of the response via the mobile device to the user, in some instances.

Patterns of behavior can include, one or more of, by way of example but not limitation, frequency that requested content is the same, frequency with which a same request is made, interval between requests, applications making a request, frequency of requests at certain times of day, day of week. In addition, multi-application traffic patterns can also be detected and tracked.

In process 612, the proxy server can notify the mobile device when content change is detected in response to the polling of the content sources. In one embodiment, cached content, when available, can be provided to satisfy application requests when content change is not detected in the polling of the content sources. For example, the local proxy can include a local cache and can satisfy application requests on the mobile device using cached content stored in the local cache. In one embodiment, the decision to use cached content versus requesting data from the content source is determined based on the patterns in application behavior. In addition, an application profile can be generated, using the application behavior of the multiple applications, in process 614.

Figure 7:
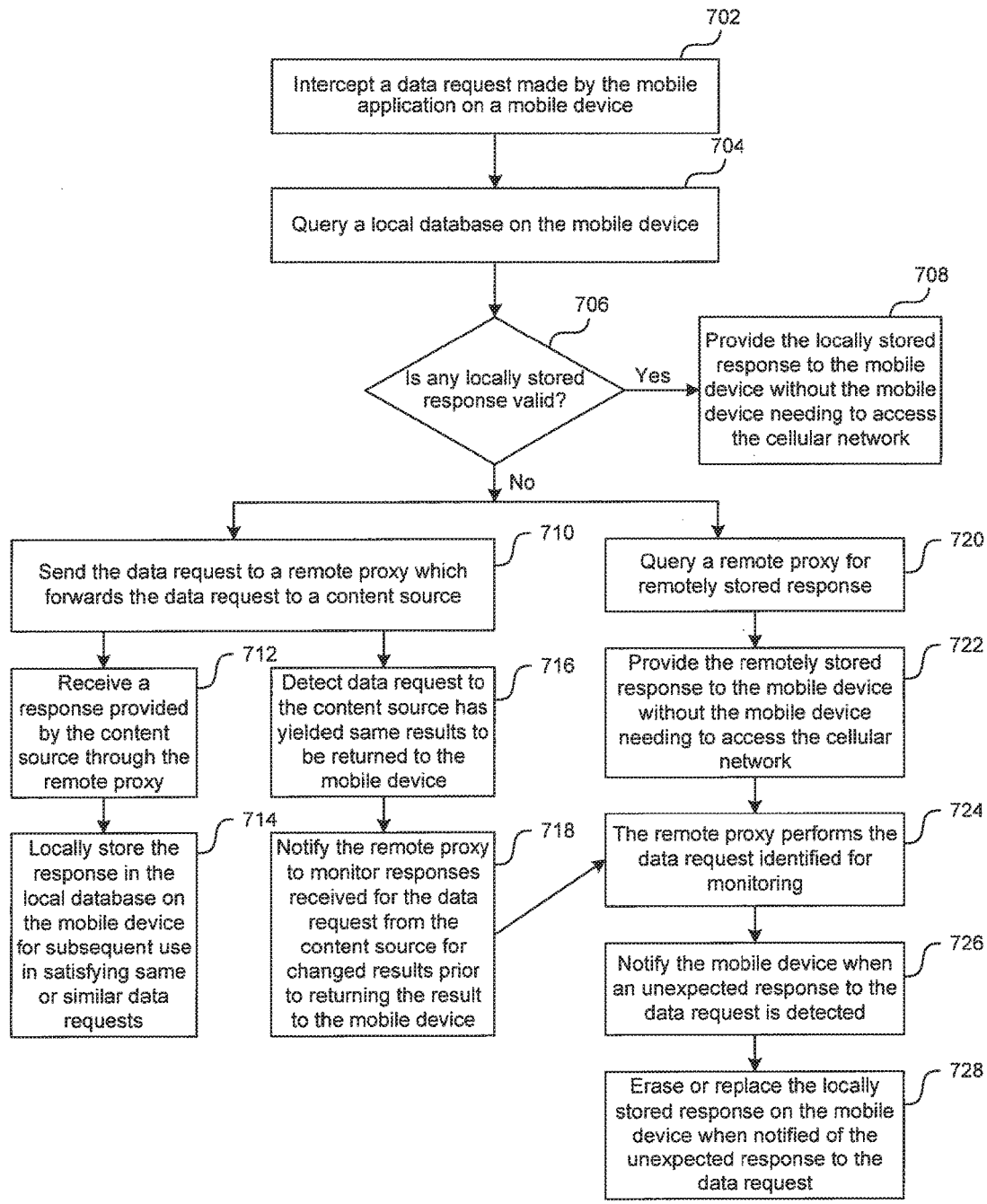
FIG. 7 depicts a flow chart illustrating an example process for mobile application traffic optimization through data monitoring and coordination in a distributed proxy and cache system.

FIG. 7 depicts a flow chart illustrating an example process for mobile application traffic optimization through data monitoring and coordination in a distributed proxy and cache system.

In process 702, a data request made by the mobile application on a mobile device is intercepted. In process 704, a local cache on the mobile device is queried.

In process 706, it is determined whether a locally stored valid response exists (e.g., whether a locally stored response is available and if so, if the stored response is still valid. If so, in process 708, the locally stored response to the mobile device without the mobile device needing to access the cellular network If not, a locally stored response is not available, or available but invalid, one or more of several approaches may be taken to optimize the traffic used in the wireless network for satisfying this request, as will be described below.

In one example, in process 710, the data request is sent to a remote proxy which forwards the data request to a content source. In general, the remote proxy can delay or modify data from the local proxy prior to transmission to the content sources. In one embodiment, the proxy server can use device properties and/or connection metadata to generate rules for satisfying request of applications on the mobile device. In addition, the proxy server can optionally gather real time traffic information about requests of applications for later use in optimizing similar connections with the mobile device or other mobile devices.

In process 712, a response provided by the content source is received through the remote proxy. In one embodiment, the remote proxy can simulate an application server authentication and querying a local cache on the mobile device to retrieve connection information if available or needed to connect to the content source. Upon authentication application server responses for the mobile application can be simulated by the remote proxy on the mobile device for data requests where responses are available in the local cache.

In process 714, the response is locally stored as cache entries in a local repository on the mobile device. The local cache entries can be stored for subsequent use in satisfying same or similar data request.

In addition, in process 716, data request to the content source is detected to yielded same results to be returned to the mobile device (e.g., detected by the local proxy on the mobile device). In response to such detection, the remote proxy is notified to monitor responses received for the data request from the content source for changed results prior to returning the result to the mobile device. In one embodiment, the local proxy can store the response as a cache entry in the local cache for the data request when the remote proxy is notified to monitor the responses for the data request.

In process 722, the remote proxy performs the data request identified for monitoring and notifies the mobile device when an unexpected response to the data request is detected. In process 724. The locally stored response on the mobile device is erased or replaced when notified of the unexpected response to the data request.

Figure 8:
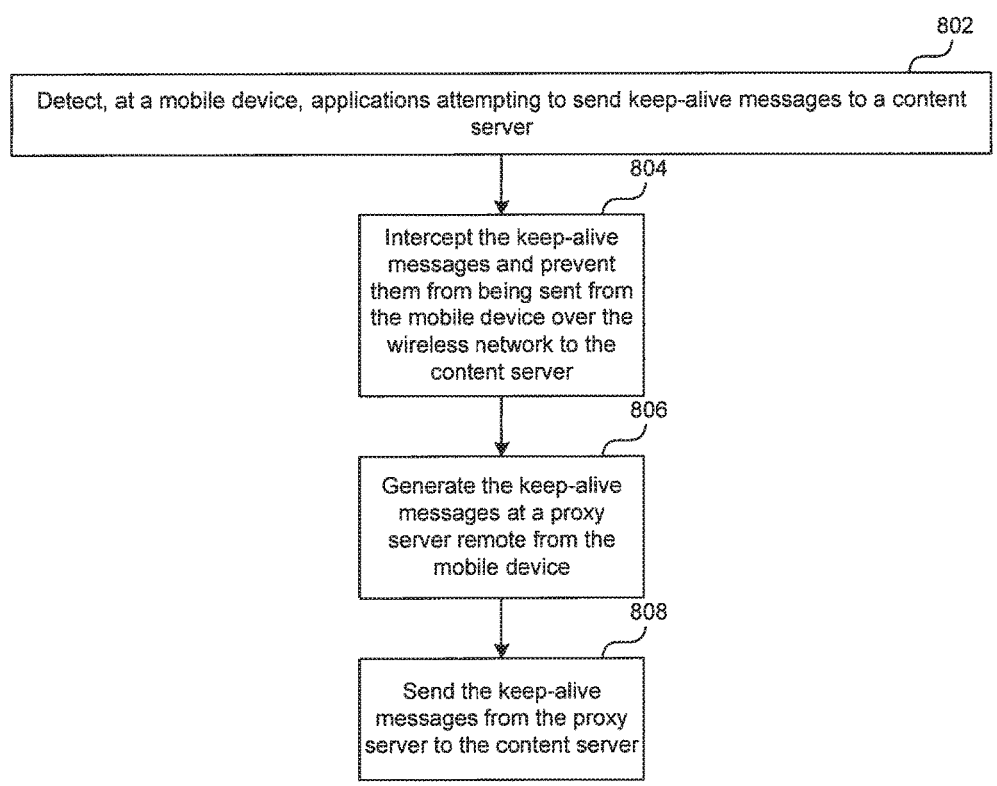
FIG. 8 depicts a flow chart illustrating an example process for preventing applications from needing to send keep-alive messages to maintain an IP connection with a content server.

In another example, when a locally stored response is not available or otherwise invalid, in process 718, a remote proxy is queried for a remotely stored response. In process 720, the remotely stored response is provided to the mobile device without the mobile device needing to access the cellular network. In process 722, the remote proxy performs the data request identified for monitoring and notifies the mobile device when an unexpected response to the data request is detected. In process 724. The locally stored response on the mobile device is erased or replaced when notified of the unexpected response to the data request FIG. 8 depicts a flow chart illustrating an example process for preventing applications from needing to send keep-alive messages to maintain an IP connection with a content server.

In process 802, applications attempting to send keep-alive messages to a content server are detected at a mobile device.

In process 804, the keep-alive messages are intercepted and prevented from being sent from the mobile device over the wireless network to the content server. Since keep-alives are similar to any other (long-poll) requests—the content on the back end typically does not change and the proxy server can keep polling the content server.

In process 806, the keep-alive messages are generated at a proxy server remote from the mobile device and sent from the proxy server to the content server, in process 808.

Figure 9:
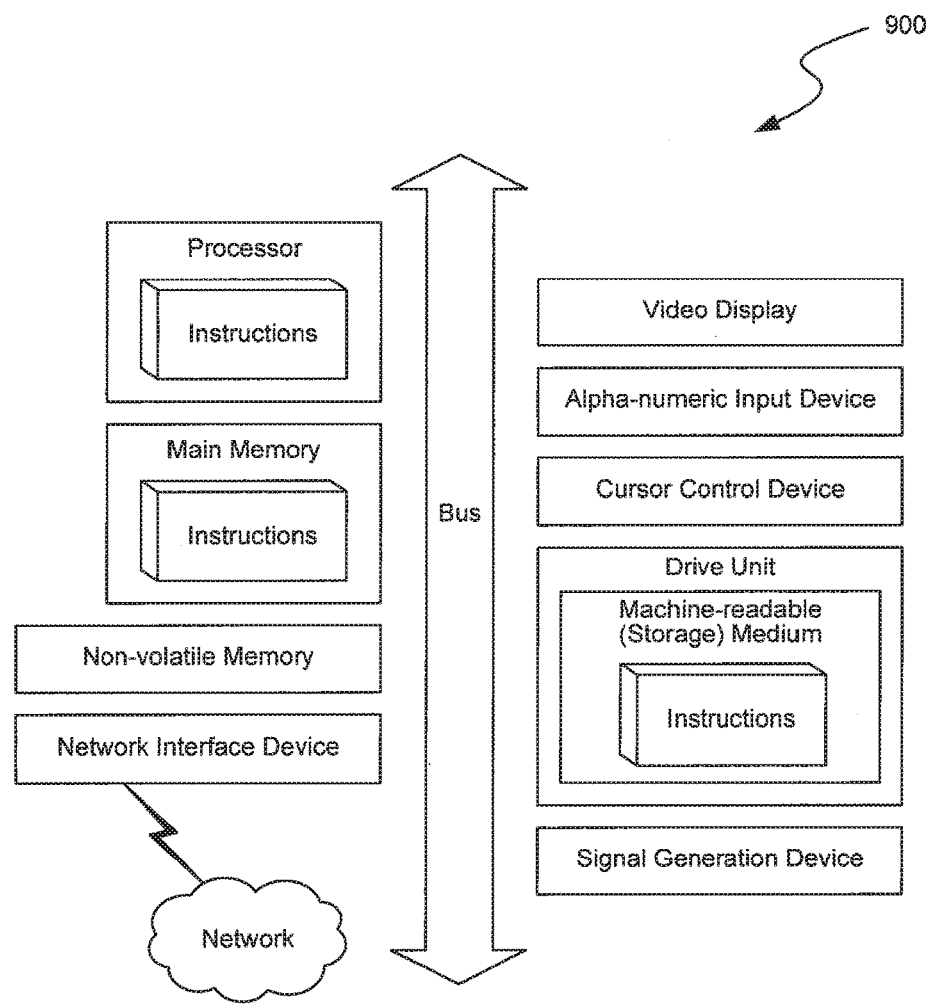
FIG. 9 shows a diagrammatic representation of a machine in the example form of a computer system within which a set of instructions, for causing the machine to perform any one or more of the methodologies discussed herein, may be executed.

FIG. 9 shows a diagrammatic representation of a machine in the example form of a computer system within which a set of instructions, for causing the machine to perform any one or more of the methodologies discussed herein, may be executed.

Establishing the Activity Session

An activity session may be recognized and activated based on a predicted activity session by either the proxy server or the local proxy in the following manner. On the device side, application activity after a period of inactivity, during which a potential activity session has been identified, can cause the local proxy to compare the data request to a list of host URLs associated with a predicted/anticipated activity session.

If the data activity matches a higher-priority entry in the URL list, for example, based on a priority threshold, the data activity may trigger the start of an activity session based on the predicted activity session. If there is no match or a lower-priority match, then the activity session may not be initiated. Other embodiments may include other prioritization schemes or priority criteria to determine when or if an activity session will be established. A predicted activity session can be recognized and converted to an Activity Session in the host server (proxy server) in a similar manner.

In some embodiments, if an activity session is detected or created by the local proxy, the local proxy can request a multiplexed connection be established to optimize the signaling during the session. If an activity session is identified by the server, the existing TCP connection opened from the mobile device can be converted into a multiplexed session and used for the optimized connection. Alternatively, the first data request from the mobile device can be accomplished outside of the multiplexed connection, and the multiplexed connection can be established for subsequent data transfers.

Once an activity session is established and has been acknowledged by the local proxy and/or proxy server, the proxy server can now proactively cache data (e.g., access the URLs or application servers/providers anticipated in the predicted activity sessions) for more rapid access to content anticipated to be needed in the predicted activity session. The system can "piggy-back" transfer of the anticipated data with other data requested by the mobile device for caching in the local cache on the mobile device. These mechanisms effectively increase the availability of desired data on the mobile, and shorten the duration of an established connection needed for the present activity session.

One example of a use case for the present technology is described as follows:

i. Predicting an activity session based on push activity in the idle state:
   1. While user is sleeping, his phone has received three push notifications from Facebook, and five emails;
   2. When user wakes up and checks his phone, he sees these notifications and emails. His natural tendency is to open these two applications and check his emails and Facebook status;
   3. Upon the transition from screen-lock to unlock, the server recognizes that based on the push activity, the user is likely to get access to these two applications. The device sends a state change notification to the server, and in response, the server sends an activity session indicator to the device. The server pre-caches information relevant to the session, and creates a persistent connection with the device to support the activity session;

4. User accesses the services, and is pleased that the relevant data seems to be already on his device;
5. The persistent connection is managed by the device and server to time out based on certain criteria, to maximize device battery life.

ii. Predicting an activity session based on a change in geographical location during idle state—as a user moves between locations, the system can recognize that they are more likely to engage in certain requests or activities based on the transit route or the new location.

iii. Predicting an activity session based on receiving a phone call in idle state based on previous user behavior, the system now recognizes that the user is likely to engage in certain behaviors upon accessing the call (such as checking a specific applications, making certain updates, accessing certain contacts in the contact book, etc.).

Cross Application Traffic Coordination

In one embodiment of the invention, a group of applications [A, B, C, . . . ] will have a timeline of transfers of information from the client to the cloud (e.g., the network) or from the cloud to the client, which can be represented as Application A: tA1, tA2, tA3, . . .
Application B: tB1, tB2, tB3, . . .
Application C: tC1, tC2, tC3, . . .

Upon the transition from screen-lock to unlock, the server recognizes that based on where each of these times may have a natural point of occurring based upon the independent activity of that application as its operations are executed in the cloud and/or client. For example, an application may transfer a message or data to the network (or vice versa) at a regular or semiregular series of times as part of a polling, maintenance, or other operation. Similarly, an application may transfer a message or data to the network (or vice versa) at a regular, semiregular, or irregular series of times as part of executing one or more of its inherent functions or operations, such as synchronizing two data stores, determining the contents of a data store, accessing new data from a remote source, exchanging control messages, etc. Initially, at least in some cases, there may be no correlation or at most a weak correlation between the times at which a transfer occurs for one application as compared to a second application. In other cases, there may be a stronger correlation between the times at which a transfer occurs for one application as compared to a second application (e.g., where an operation of a first application is dependent upon or triggers an operation of a second application, or where a user typically executes an operation of one application in conjunction with an operation of a second application).

In some embodiments, in order to optimize (typically to minimize) the number of times that a device (e.g., a handset) radio is turned on and thereby reduce its consumption of power (and hence conserve its battery or other power source), the client proxy and server proxy may both operate to intercept these transfers (or requests for transfer) of information and delay the time at which one or more of these transfers would normally occur in order to perform multiple such transfers together as part of a single transfer operation (i.e., instead of performing multiple, individual transfers). The delay time (D) may represent a maximum delay value after receipt of a request to make such a transfer, with the value of D determined so as to enable the collection of as many of the transfers as feasible in a single, optimized data transfer without incurring any undesired penalties or inefficiencies, or having an undesired impact on the user experience. In some embodiments, this may mean that D is determined based on consideration of one or more of the priority of the application (or the relative priority of one application in comparison to another), the nature or amount of data involved in the transfer (e.g., whether it represents fresh data, a housekeeping function, a control instruction, etc.), the status of the application (e.g., active, inactive, background, foreground, etc.), a useable lifetime of the data to be transferred (a period before it becomes stale), the interval between the transfer times for a single application, the interval between the transfer times across more than one application (e.g., the largest transfer time interval based on consideration of all active applications), network characteristics (available bandwidth, network latency, etc.), or another relevant factor. In some embodiments, the size of the delay D can be controlled by the device (and user) as part of optimizing the battery life of the device by enabling the user to force a batch exchange of data in response to the requests of one or more applications instead of performing multiple data transfers.

Connection Optimization

Techniques are known in the art for reusing TCP connections, such as persistent TCP sessions and TCP connection pooling. Both techniques on the mobile client side allow previously-established TCP connections to the same server to be reused for multiple HTTP transactions, which saves connection establishment and tear-down times between transactions. However, with multiple applications running, and each establishing their own TCP connections to perhaps multiple host servers, there are still potentially many TCP connections being established during a given time of network activity.

A benefit of a distributed proxy architecture (such as that described above), where each end-point (i.e., the proxy in the client and the proxy in the server) is well known by the system, is that a single TCP connection can be used to transport all of the application traffic during an established activity session. The WebMUX and SCP protocols allow multiplexing of multiple sessions of application-level protocols (such as HTTP) over a single TCP connection. In one embodiment of the present invention, an activity session may be supported by a multiplexed TCP connection using these or a similar mechanism. In another embodiment, the activity session may be supported by a TCP connection pool, with the connection reuse enhanced by nature of connecting to a single proxy server (or proxy in a server) for all requests.

Prediction Basis

Mobile application usage is sporadic in nature. Generally, there are periods of user inactivity followed by periods of multiple application usage, such as where a user is updating their Facebook status, sending a Tweet, checking their email, and using other applications to get an update of their online information. This doesn't mean, however, that the mobile device is inactive during user inactivity: the device may be actively downloading new content such as advertisements, polling for email, and receiving push notifications for activities on the Internet. In some situations, the distributed proxy system and architecture described above is designed to eliminate much of this "background" data access in order to improve signaling efficiency and use of network resources.

In some embodiments of the present invention, the Traffic Shaping module in the server functions to categorize the activity that is being processed by the server since the last user activity session. The Traffic Shaping module creates a Potential Activity Session for each mobile device, which may include:

1) A list of URLs representing host targets (push notification senders, email hosts, web services);
2) For each URL, a count of pending data that is available to the user for that target URL; and 3) For each URL, a last-accessed time and a frequency of access.

Once created, the data may be prioritized based on last accessed time, frequency, pending data count, or other criteria to form a prioritized list of host URL targets. This Potential Activity Session forms the basis for predicting whether a subsequent mobile device data request will activate the session (i.e., turn the Potential Activity Session into an Activity Session). The prioritization or prediction of this occurring may also be based on one or more data types or characteristics, heuristics, algorithms, collaborative filtering techniques, etc. that process data to determine a most likely behavior by a user. For example, the data processing may determine that there is a relatively high correlation between a user accessing one type of application, followed by them accessing a second application. Or, that when a user becomes active on their device after a certain amount of time, they are likely to engage in a series of actions, data requests, etc.

Or, that when sufficient new data (notifications, messages, etc.) has become available to the user, they are likely to access it in a certain order (such as by activating a series of applications or generating a series of requests in a certain order).

In some embodiments, or in addition to the server prediction approach described above, the client device may use contextual cues available via hardware sensors or application activity indications to predict the likelihood of the start of an activity session. For example, a client-side proxy may monitor location changes in the device to predict that a location update may be sent to, a location-based service, or may monitor user activity at certain geographical locations to set up a Potential Activity Session based on historical application usage at a particular location. The Potential Activity Session, although derived by means of hardware context on the mobile device (e.g., the state or operating status of the device), is typically the same in structure as that created on the server.

When WCDMA was specified, there was no or very little attention to requirements posed by applications whose functions are based on actions initiated by the network, in contrast to functions initiated by the user or by the device. Such applications include, for example, push email, instant messaging, visual voicemail and voice and video telephony, and others. Such applications typically require an always-on IP connection and frequent transmit of small bits of data. WCDMA networks are designed and optimized for high-throughput of large amounts of data, not for applications that require frequent, but low-throughput and/or small amounts of data. Each transaction puts radio in a high power mode for considerable length of time—typically between 15-30 seconds. As the high power mode can consume as much as 100x the power as an idle mode, these network-initiated applications drain battery in WCDMA networks very fast. The issue has been exaggerated by the rapid increase of popularity of applications with network-initiated functionalities, such as push email.

The obvious lack of proper support has prompted a number of vendors to provide documents to guide their operator partners and independent software vendors to configure their networks and applications to perform better in WCDMA networks. This guidance mainly focus on two things: configuring networks to go to stay on high-power radio mode as short as possible and making periodic keep alive messages that are used to maintain an always-on TCP/IP connection as infrequent as possible. Such solutions typically assume lack of coordination between the user, the application and the network, forcing the network to guess what the application might be doing, and application to act independently of whether user actually is available for taking action on any network initiated activity.

Embodiments of the present invention utilize a device client that provides the front-line user interface to users for accessing various services, such as push email, instant messaging, visual voice mail etc. In context of battery conservation, the Device Client observes user activity (for example, by observing user keystrokes, backlight status etc) and alters its own behavior, as well as asks the Communications Server to alter its behavior based on user activity:

(1) Cumulating/batching low priority transactions originating from the device and sending them only after user has been inactive for certain period of time. Such low priority transactions may include marking emails read or unread or deleting emails. The logic is that there is no value on sending these transactions while user is engaged with the mobile device.

(2) Notifying the Communications Servers when user is inactive—a certain inactivity timeout has been exceeded. On receipt of such notification, the Communication Server may throttle down the frequency of push of new transactions to the device, thus resulting in having radio on high power less frequently. The notification will only be sent to network piggybacking on a receipt of new high importance data, such as new email, for two reasons: (a) as it is the activation of radio that drains battery, sending data to network separately would essentially consume as much battery as sending it as soon as incoming data is received (b) it ensures that user, whenever back with the device, does have the high importance data (such as new email) waiting in the inbox (3) Notifying the Communications Servers once user becomes active again, requesting immediate sending of any buffered data.

Additionally, the Device Client, recognizing the time criticality of specific transactions, will interact directly with the radio interface on the device, requesting transmission on lower-power radio modes (where available) for non-critical data and high-power modes for critical data—typically where the data transfer is user-initiated and user is waiting for the response.

Also, the Device Client, having the ability to control and cache data transmissions, will interact directly with the radio interface on the device, requesting radio to go idle directly after a transmission if it concludes that the probability of user-initiated time critical transmission is low. This happens, for example, in cases where Device Client has observed certain period of inactivity from the user.

As a further component of the presently disclosed invention is a notification server that provides a Network Server the capability to wake up the Device Client when device client is not actively connected to the Network Server. This functionality, originally invented in a patent application referenced below has a side effect of significant power conservation, as the Device Client does not need to maintain an always-on TCP UP connection to allow the Network Server to send updates and notifications to the Device Client. The highest significance of this is that always-on TCP IIP connection requires periodic keep alives that consume significant power. The notification server allows for the switching off of keep alives altogether, as always-on TCP/IP connection is not required, thus reducing need for frequent data transfer that drains battery in especially in WCDMA.

The network server acts as the communication link between the Device Clients, Communications Servers and Notification Server.

Communication server act as the Device Client's and user's agent in the network, providing connectivity to user's email inbox, instant messaging community, visual voicemail inbox, VoIP community etc. Separate Communication Servers may be used to connect to different services. In context of battery conservation, it performs two tasks.

(1) When notified of user inactivity by Device Client, it sustains from sending any data to the Device Client. The sending may be resumed, for example, after a specified time, or by Device Client notifying user being active again (2) In cases where Communications Server can monitor user activity in their own data storage, such as email inbox, it will batch low priority changes (such as deletes or markings as read/unread) until inactivity is observed. The activity in the mailbox can be considered as a proxy that user is active on some other interface to their mailbox, such as their PC, and thus not actively expecting updates to their mobile device.

Batching of Low Priority Changes

Current design of Cava assumes that the IP connection is always on and immediately sends any and all changes to the other end point. This leads to the 'real time' always up to date experience but also to large and undesirable battery drain. The battery drain comes from radio over-head introduced by the device when it sends data. Sending data turns out to be the expensive operation from a power consumption point of view not keeping a connection up. Any time the radio is used to send data—regardless the size of data packet being sent—the radio is left in a high power state for a number of seconds. This causes significant battery drain.

This effect is especially strong in UMTS or 3G networks where a minimal radio on event seems to take as much at 2× that of an equivalent 2.5G or GPRS event.

In order to minimize the negative battery drain effect we want a process for collecting low priority changes and sending them to the server in batches rather than individually. A priority listing is illustrated in Table I.

These proposed changes will affect all accounts/products and are fundamental changes to the 'always in sync' nature of our clients.

Manual sync—regardless of product should always cause a complete update of the inbox—high and low priority changes should be brought into sync and any data source reliant on a partial poll should complete a full poll and full sync in order to pick up all changes including folder changes, email deletes etc.

Client Changes (IP only and Hybrid IP & SMS)
Batching Changes

Currently all changes are sent as soon as possible from the client to the server.

Required Changes

1. The client will not automatically send low priority changes to the server.
2. The client will always send any (all registered accounts) unsent low priority changes to the server with the any high priority change it sends or with or instead of any KA.
3. The client will always immediately respond with any low priority changes if it receives data from the relay server (if a client receives data of any kind, including a ping from the OA admin UI, then the radio has been turned on and we should send low priority changes to the server while it is on)
4. If low priority changes are still unsent after the user has been inactive on their device for 120 secs then any unsent changes should be sent to the server. The inactive time is brandable and defined by brand variable @client.inactivity_low_proirity_operation@ which is set to 120 secs by default. In other words once the inactive time has expired a batch of low priority changes is treated like a high priority change and is sent to the server.
   a. The inactively we want to track here is the user's interaction on the whole device where possible (J2ME—will have to rely on activity within our client, other platforms we should use the device wide user activity timers).
5. There needs to be a brandable parameter to turn this batching feature on and off. The default for this parameter should be on. Off may be needed for automated testing and load testing. Future requirements may need this on/off control to be visible in the client UI.

Device Inactivity.

Our different platforms have to implement detection of device inactivity differently.

Initial cross code (C++) implementation of this feature sends a low priority change @client.inactivity_low_proirity_operation@ after the last low priority change has been received in the device. Although an improvement, this is not ideal as it does not delay a low priority change while the user reads an already 'read' emails or complete other non-changing causing activities like writing an email.

WinMo

System SEVEN forms a plug-in to the base Operating System in this platform so we can not directly detect when a user is reading emails. The closest we can get to monitoring the user whole device activity is to request the device to notify us when the backlight turns off. The user idle logic for WinMo therefore needs to be:

1. always send pending low priority changes with high priority changes
2. when a low priority change comes in send it after the following wait:
   a. device screen goes idle and stays idle for @client.idle_delay_low_proirity_operation@ which should be set to 120 secs by default
   b. maximum wait=@client.max_delay_low_proirity_operation@ (set to 900 secs by default) from time any low priority change is received.

If screen idle cannot be implemented then we will have to rely on a waiting @ client.inactivity_low_proirity_operation@ after the last low priority change has been received in the device, as implemented in the initial coding noted above.

Symbian

System SEVEN forms a plug-in to the base Operating System in this platform so we can not directly detect when a user is reading emails. The closest we can get to monitoring the user whole device activity is to use a device API that returns the 'time since last user activity' (usually a key press). The user idle logic for Symbian can then mirror that for WinMo.

If screen idle cannot be implemented then we will have to rely on a waiting @ client.inactivity_low_proirity_operation@ after the last low priority change has been received in the device, as implemented in the initial coding noted above.

Brew

System SEVEN is the whole of the email application (and more) for BREW, so we have more options available for monitoring user activity. The closest we can get to monitoring the user whole device activity is to periodically poll the device to identify if the backlight is off. This is similar to our current polling for battery level. The user idle logic for Brew can then mirror that for WinMo.

If screen idle cannot be implemented then we should watch the user for any interaction with our app (Is the Flash Engine up) and only sent low priority changes @client.inactivity_low_proirity_operation@ seconds after the user stops using us (exits the flash UI)

Palm

System SEVEN is the whole of the email application for Palm, so we have more options available for monitoring user activity. The closest we can get to monitoring the user whole device activity is to watch for key press'. The user idle logic therefore needs to be:
1. always send pending low priority changes with high priority changes
2. when a low priority change comes in send it after the following wait:
   a. no device key presses are detected for @client.idle_delay_low_proirity_operation@ which should be set to 120 secs by default
   b. maximum wait=@client.max_delay_ low_proirity_operation@ (set to 900 secs by default) from time any low priority change is received.

If key press monitoring cannot be implemented then we should watch the user for any interaction with our app and only sent low priority changes @client.inactivity_low_proirity_operation@ seconds after the user stops using us.

J2ME

System SEVEN is the whole of the email application but is limited to working within the J2ME 'sand box' on the device. Two 'styles' of J2ME exist on phones, one that supports a background mode and one that does not. J2ME can detect key strokes while we are in the foreground mode but not in background. We can also query the device screen and find out if the last screen load we sent is still being shown. The J2ME client also has to deal with the red key which acts as an immediate 'kill'. The user logic therefore needs to be:
1. always send pending low priority changes with high priority changes
2. add, a challenge screen, such that if a user selects 'exit' or minimizes (sends to background) then a screen is shown to the user Title: Pending Changes. Body: You have pending changes. Do you want to send them now? Buttons: Yes, No, If yes is pressed send them, if No then don't until user next opens the client, brings it into the foreground or a high priority event occurs (background sync). Even if the changes don't get send for a while the user is informed. The Application will exit without the 'pending changes screen when the red end key is pressed or a phone call/SMS interrupts our application, and the user says 'No' to a later 'Resume Application' prompt. In such cases changes will be sent on the next application start.
3. The J2me app can only go into a background mode if either the user selects to minimize it which is covered in 2 above, or press' a direct suspend button. Because of the direct suspend button, we will need the client_max_delay. The main use case for J2ME is to open the app look at email and close/minimize it again, in which case you will see the challenge screen covered in point 2 above. It will be rare for the app to sit with low priority changes so the added complexity of the client_idle_delay is not justified and is not needed.

All connection errors and retries should apply in the same way that they currently do to any device data sends.

The end result of these changes is that a user will be able to read and delete their entire inbox without causing the radio to be turned on until they have been inactive for a period of time. This inbox triage is one of the most common activities and currently causes significant battery drain.

Pruning Inbox

While reviewing power logs it was noticed that we currently prune our inbox in 'real time'. In other words if the user has their preferences set to 'keep emails 7 days old' then the moment that an email becomes 7 days and 1 sec old we initiate an email delete from the client side inbox. This requires a connection to the RS and causes a power event (even if a connection is present). Pruning the inbox is not time sensitive and does not justify additional power events. To minimize power usage we should 'piggy back' removal of old emails from our inbox window on other RS communications.

Required Changes
1. The client will monitor for pruning events as per current behavior
2. A 'pending' pruning event will never trigger a data transfer or connect
3. Pending pruning event will be sent to the server with the next RS communication that takes place.

The result of this is that your inbox could become bloated with email that is out of your interest window but only if you have not received new email and have not used the client (sent and email, read/unread email, changed settings etc).

Server Changes—WE and EE Connectors

Currently the WE and EE connectors are aware of high and low priority changes and attempts to send all changes as soon as possible to the Relay Server (RS). The connector flags the priority of the changes in its message to the RS. If the client is connected the RS delivers the changes and tells the connector that the changes have been delivered. If the client is not connected the RS decides whether it will send an SMS to the client based upon whether the client can receive SMS's (is in Hybrid mode) and on the priority of the changes (SMS's are not sent for low priority changes). It then drops the actual changes and tells the Connector that they have not been delivered. When the client next connects (due to a KA or to the SMS arriving) then the RS tells the connector that the client has connected and the connector sends any undelivered changes to the RS for delivery to the client.

Required Changes
1. The connector will not automatically send low priority changes to the client (the change here if to clients operating in IP only mode). (this could be implemented at the RS to mirror the SMS logic if that is easier)
2. The connector will always send any unsent low priority changes to the server with the any high priority change it sends (confirm this is the case)
3. The connector will always immediately respond with any low priority changes if it receives data from a client (if a connector receives data of any kind, including a settings updates, then the radio has been turned on and we should send low priority changes to the client while it is on). It would be nice to include KA's here but currently they are handled by the RS and don't 'make it' to the connector.
4. when a low priority change(s) are detected, send it/them after the following wait:
   a. no activity have been seen on their email for @server.inactivity_WEEEconnector_delay_low_proirity_operation@ which should be set to 900 secs (15 mins) by default b. maximum wait=@ server.max_WEEEconnector_delay_low_proirity_operation@ (set to 1800 secs by default) from time any low priority change is received.
5. The users inactivity period will be reset if the connector is restarted. The connector has to send a status packet so the radio price has to be paid anyway.

All connection errors and retries should apply in the same way that they currently do to any connector data sends.

The end result of these changes is that a user will be able to manage a full session from their rich client reading and deleting many emails before causing the radio on their phone to be turned on. This inbox triage is one of the most common activities and currently causes significant battery drain.

Server Changes—OWA & CE Connector

Currently the OWA & CE connectors have two ways to detect a change. Either they are notified by the data source or poll the data source and detect a change directly. OWA notifications and many ISP notification systems only notify us of high priority changes this is ideal as we then only send high priority changes to the client immediately. In order to pick up any other changes we complete a back ground poll periodically. The polling interval can be set for each ISP and defaults to 5 mins.

The 5 minutes is for polling without notifications—if notifications are enabled, we only poll every 5*POLLING_INTERVAL minutes meaning mark-as-reads are discovered potentially 25 minutes they take place Required Changes
None CE always sends anything it finds in a poll to the client right away, but only high-priority changes cause a trigger to be sent to the client. So marking emails as read results in a sync package being sent to the client, but if client is not online, the package will be nacked and CE knows changes weren't received, resending them in the next poll.

If we receive a notification it will be for a high priority changes and so reacting to it by polling and sending data or an SMS is the correct thing to do.

Items to consider for future improvements:
1. The connector will always send any unsent low priority changes to the server with the any high priority change it sends but does not wait for high priority changes before sending the low priority changes, see description above.
2. The connector will always immediately respond with any low priority changes if it receives data from a client (if a connector receives data of any kind, including a settings updates, then the radio has been turned on and we should send low priority changes to the client while it is on). It would be nice to include KA's here but currently they are handled by the RS and don't 'make it' to the connector.
3. If we find only low priority changes during a poll and they are still unsent after 3N mins (3 successive polls if account is not receiving notifications) then any unsent changes should be sent to the client. The number (3) should be a parameter that can be easily changed or optimized (@server.max_poll_repeats_low_proirity_operation@).

In other words if we have not found a high priority change in 3 polls we send the low priority changes and they would cause an SMS to be sent.
a. If the account has received a notification and is in backup polling then the user may get low priority changes following every poll. In this scenario we should not wait 3N mins we should detect that 3N<5N (our next poll) and send them immediately.

All connection errors and retries should apply in the same way that they currently do to any connector data sends.

Power Save Mode (IP & hybrid SMS Mode)

The over view of this mode is as follows:
1. The client monitors user activity on the device (see section below). Each platform will do this in their own way but is it usually done with a backlight state API or monitoring keyboard clicks. If the user is active on the device, push behavior is as currently implemented. In IP only mode always-on-push is maintained in hybrid mode SMS triggers are immediately sent and responded too.
2. After @client.inactivity_power_save_secs@ set to 1200 (20 mins) by default time has expired since the last end user device activity then the device goes into power saving mode.
3. The client waits for the next new email to be delivered by the server (Connect to receive email etc) and responds with a power save RPC call to all the account end points it currently has registered. NOTE this requires a new Sync layer RPC. NOTE this may require multiple RPC calls (one per registered account) but they should be timed to use the same high power radio event, as each other and the reason for the power event in the first place (receiving an email), for example, timed within milliseconds of each other.
4. The power save RPC call will include a time (power save period) indicating to the connectors when the client next wants to receive any changes.
5. The $1^{st}$, N power saving periods in a single power save event will be @client.push_batch_period_one_power_save_secs@ set to 900 (15 mins) by default long
any additional consecutive power saving periods will be @client.push_batch_period_two_power_save_secs@ set to 3600 (1 hour) by default
N=@server.push_batch_period_one_repeat_power_save_secs@ set to 4 by default
Any activity on the device takes the client out of power saving mode and end that particular power save event.
If additional data is received before the end of any one power saving period, then the wait period communicated to the connectors will be the existing period—elapsed time since the power save RPC was sent.
6. When a connector receives a power save notification from a device it stops sending changes (data or SMS's) for the period of time requested (the wait period). At the end of the wait period any notifications received will be acted upon and changes sent to the device as a single event if no notifications come in then true push will resume with the data or an SMS being sent immediately to the device.
7. The wait period must be able to be updated as the client may send additional power saving RPCs (with updated wait times) if multi accounts respond to the end of a wait period with different delays.
8. Coordinating all connectors for a particular device (7TP) address to reach the end of a wait period together would be ideal but is not easily possible and will not be done at this time. This maximizes the chance that any change batches sent to the client from multiple accounts will arrive at the device at the same time and will only cause one power event by strictly adhering the to the wait periods send from the client unless the connector knows that it is 'running' slow or always takes x more seconds to complete than our standard WE/EE backend. In this case the connector may start the poll or data collect event x seconds early in order to increase the chance that the client will receive data at their specified time. NOTE this is at best going to increase chances of hitting the powered up window.
9. Whenever new email comes into the client while it is in a power saving mode it responds with the power saving RPC to all end points currently registered. The next power save period will be communicated based on the logic in point 5 above.
10. If the client needs to send a keep-alive while it is in power saving mode then it sends the keep-alive and reconnects if necessary.—optimizing the keep-alive and reconnection logic during power saving mode is an area we will improve on in the future.
11. Whenever the device detects user activity (key press' or backlight on) then it exits' power saving mode, if a power saving period is currently in progress then the client sends a power save cancel RPC to its backend connectors and immediately receives any changes associated with any pending notifications. This may require a poll to be run by the connector after receiving the power saving cancel RPC. If the latest power saving period has expired then no power save cancel RPC is required as the connectors will already be in normal true push operational mode.
12. Devices should come out of and not go into power save mode if they are 'plugged in' to charge.
13. Quiet time hours should not affect the calculation of entering power save mode. However we should still respect the quiet time hours and disconnect during them. At the end of a quiet time the client should reconnect and receive any data waiting on the connector but should then immediately send another power save RPC if the device has not shown any end user activity. Note the timing here is critical so that the power event that receives the data should also cover the power save RPC.
14. Power save RPCs should not be retried. We should just wait for the next new mail and send another power save RPC if appropriate.
15. There needs to be a brandable parameter to turn support for power save mode on and off. The default for this parameter should be 'on'. Off may be needed for automated testing and load testing. Future requirements may need this on/off control to be visible in the client UI.
16. Currently the CE server optimizes load by only polling a CE account once even if a user is accessing that account with two devices. We will poll the account any time either device/account require us too but will only send data to devices who want it (ie are not in power save mode).
17. Calendar and contact changes will continue to be delivered as soon as they are discovered. They will also not trigger a power save response from the client. If sending calendar or contact data. Any pending email data is sent.

The end result of these changes is that a user that receives multiple emails while not interacting with their phone will have a significantly prolonged battery life. The more emails a user receives the greater the power savings for their phone.

The two user cases that have driven the default parameter settings are the 1-2 hour lunch or meeting—where the system now moves into power saving mode after 30 minutes and then only sync 4 times even if a user received 35 emails in that hour. The other is leaving a phone on over night but with quiet hours set poorly (for example, only quiet for 4 hours 00:00 to 04:0). In this case, a once an hour sync state is provided to thereby preserve your battery despite the short quiet time you have set.

In the initial implementation power saving mode will not be respected by the CE connector for accounts that are activated on more than one device. This is because the CE account manager combines accounts into a single poll request for the same account if it is activated on more than one device. The complexity of supporting two polls at different times due to different power saving status of two or more devices is not wanted for the initial implementation.

Various platforms implement detection of device activity differently. In one embodiment, the system forms a plug-in to the base Operating System in this platform. One method for monitoring the user device activity is to request the device to notify us when the backlight turns off. The user idle logic is thus:
  1. Enter power saving mode:
     device screen goes idle and stays idle for @client.inactivity_power_save_secs@ set to 1200 by default
  2. Exit power saving mode:
     device screen turns on Another embodiment forms a plug-in to the base Operating System in this platform. One method for monitoring the user device activity is to use a device API that returns the 'time since last user activity' (usually a key press). The user idle logic is thus:
  1. Enter power saving mode:
     device screen goes idle and stays idle for @client.inactivity_power_save_secs @ set to 1200 by default
     Detect this by calling the last user activity API and then waiting until the timer might be up and calling it again to see if the user has remained inactive.
  2. Exit power saving mode:
     Detect activity by calling the last user activity API regularly—every 5 mins.

In another embodiment, one method for monitoring the user device activity is to periodically poll the device to identify if the backlight is off. This is similar to our current polling for battery level. The user idle logic is therefor:
  1. Enter power saving mode:
     device screen goes idle and stays idle for @client.inactivity_power_save_secs @ set to 1200 by default
     We will need to detect this by calling the last user activity API and then waiting until our timer might be up and calling it again to see if the user has remained inactive.
  2. Exit power saving mode:
     Detect activity by calling the last user activity API regularly, such as every 5 mins.

In another embodiment, one method for monitoring the user device activity is to watch for key press'. The user idle logic therefore needs to be:
  1. Enter power saving mode:
     if no keys are pressed for @client.inactivity_power_save_secs @ set to 1200 by default
  2. Exit power saving mode:
     on first device key press.

Provided herein is an email application that is limited to working within the Java Platform ("J2ME") 'sand box' on the device. Two 'styles' of J2ME exist on phones, one that supports a background mode and one that does not. J2ME can detect key strokes while we are in the foreground mode but not in background. One method is to query the device screen and find out if the last screen load that was sent is still being shown. The J2ME client also has to deal with the red key which acts as an immediate 'kill'. The user logic therefore needs to be:

1. If the application is exited then no changes—there is provided a "would you like to sync?" screen shown on client launch.
2. Enter power saving mode:
   enters background mode and has been in it for at least @client.inactivity_power_save_secs @ set to 1200 by default
   OR we are in foreground mode and no keys have been pressed for that amount of time
3. Exit power saving mode: This may be done by going from background mode into foreground mode. OR a key is pressed while we are in foreground mode.
4. All connection errors and retries should apply in the same way that they currently do to any device data sends.

Current design of Cava assumes that the IP connection is always on and immediately sends any and all changes to the other end point. This leads to the 'real time' always up to date experience but also to large and undesirable battery drain. The battery drain comes from radio over-head introduced by the device when it sends data. Sending data turns out to be the expensive operation from a power consumption point of view not keeping a connection up. Any time the radio is used to send data—regardless the size of data packet being sent—the radio is left in a high power state for a number of seconds. This causes significant battery drain. This effect is especially strong in UMTS or 3G networks where a minimal radio on event seems to take as much at 2× that of an equivalent 2.5G or GPRS event. In order to minimize the negative battery drain we want a process for collecting large numbers of new emails (or high priority changes) and syncing them in batches rather than individually. We are going to achieve this by introducing a 'power save' mode. This change is targeted at improving the power performance especially for users who receive a large number of emails during the day. These proposed changes will affect all accounts/products and are fundamental changes to the/ always in sync' nature of our clients.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways.

Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶ 6, other aspects may likewise be embodied as a means-plus-function claim, or in other forms, such as being embodied in a computer-readable medium. (Any claims intended to be treated under 35 U.S.C. § 112, ¶ 6 will begin with the words "means for".) Accordingly, the applicant reserves the right to add additional claims after filing the application to pursue such additional claim forms for other aspects of the disclosure.

What is claimed is:

1. A mobile device having an established multiplexed connection for optimizing communications, the mobile device comprising:
   a memory; and
   a processor configured for:
      receiving a selection from a user whether to enable an application for fetching;
      communicating over the established multiplexed connection;
      predicting an activity session based on application access history, wherein the application access history includes historical application usage;
      fetching data for the application before the activity session to support the predicted activity session before beginning the activity session, wherein the application is operating in a background of the mobile device, wherein the data is fetched if the fetching is enabled by the user selection for the application, wherein at least some of the fetched data is for background requests made by the application on the mobile device;
   wherein a second connection is established that is other than the established multiplexed connection with the mobile device,
   wherein fetching data occurs over the second connection; and
   disconnecting from the second connection.

2. The mobile device of claim 1, wherein the established multiplex connection is a TCP connection.

3. The mobile device of claim 1, wherein the application access history includes a pattern of multiple mobile application use on the mobile device.

4. The mobile device of claim 1, wherein the activity session is activated by the mobile device.

5. The mobile device of claim 1, wherein the fetching of the data can be enabled or disabled by a user selection such that fetching for multiple applications can be enabled or disabled by a single user selection.

6. The mobile device of claim 1, further comprising an application behavior detector to track application behavior.

7. The mobile device of claim 6, wherein the application behavior can be used by the mobile device to optimize traffic by aligning content requests by applications.

8. The mobile device of claim 1, wherein data requests for multiple applications are aligned.

9. The mobile device of claim 1, wherein the application access history includes a time of day of access.

10. The mobile device of claim 1, wherein the mobile device initiates the second connection.

11. The mobile device of claim 1, wherein the activity session occurs after a period of inactivity for the application supported by the activity session.

12. A method of optimizing communications for a mobile device, the method comprising:
   receiving a selection from a user whether to enable an application for fetching;
   communicating over an established multiplexed connection;
   predicting an activity session based on application access history, wherein the application access history includes historical application usage;
   fetching data for application before the activity session to support the predicted activity session before beginning the activity session, wherein the application is operating in a background of the mobile device, wherein the data is fetched if the fetching is enabled by the user selection for the application, wherein at least some of the fetched data is for background requests made by an application on the mobile device;
   wherein a second connection is established that is other than the established multiplexed connection with the mobile device,
   wherein fetching data occurs over the second connection; and
   disconnecting from the second connection.

13. The method of claim 12, wherein the established multiplex connection is a TCP connection.

14. The method of claim 12, wherein the application access history includes a pattern of multiple mobile application use on the mobile device.

15. The method of claim 12, wherein the activity session is activated by the mobile device.

16. The method of claim 12, wherein the fetching of the data can be enabled or disabled by a user selection such that fetching for multiple applications can be enabled or disabled by a single user selection.

17. The method of claim 12, comprising tracking application behavior.

18. The method of claim 17, wherein the application behavior can be used by the mobile device to optimize traffic by aligning content requests by applications.

19. The method of claim 12, wherein data requests for multiple applications are aligned.

20. The method of claim 12, wherein the application access history includes a time of day of access.

21. The method of claim 12, wherein the mobile device initiates the second connection.

22. The method of claim 12, wherein the activity session occurs after a period of inactivity for the application supported by the activity session.

23. The mobile device of claim 1, wherein data is not fetched for another application that is not enabled for fetching by the user selection.

24. The method of claim 12, wherein data is not fetched for another application that is not enabled for fetching by the user selection.

* * * * *